United States Patent [19]

Lee

[11] Patent Number: 4,746,940
[45] Date of Patent: May 24, 1988

[54] LINE SCANNER TO REDUCE BANDING

[75] Inventor: Denny L. Y. Lee, West Chester, Pa.

[73] Assignee: E. I. Du Pont de Nemours and Company, Wilmington, Del.

[21] Appl. No.: 934,827

[22] Filed: Nov. 25, 1986

[51] Int. Cl.[4] .............................................. G01D 15/14
[52] U.S. Cl. ................................... 346/160; 355/14 R
[58] Field of Search ..................... 346/153.1, 158, 159, 346/160; 355/14 R, 71

[56] References Cited

U.S. PATENT DOCUMENTS

| | | | |
|---|---|---|---|
| 3,700,955 | 10/1972 | Lowe | 315/20 |
| 4,134,668 | 1/1979 | Coburn | 355/3 R |
| 4,201,996 | 5/1980 | Stein | 346/158 |
| 4,268,159 | 5/1981 | Tashiro | 355/3 R |
| 4,350,435 | 9/1982 | Fiske et al. | 355/14 |
| 4,355,891 | 10/1982 | Cole et al. | 355/71 X |
| 4,359,745 | 11/1982 | Reid | 346/23 |
| 4,367,943 | 1/1983 | Nakamura | 355/3 R |
| 4,446,472 | 5/1984 | Kato et al. | 346/153.1 |
| 4,458,258 | 7/1984 | Amaya et al. | 346/153.1 |
| 4,524,116 | 6/1985 | Humberstone | 430/31 |
| 4,551,732 | 11/1985 | Rogers | 346/110 R |
| 4,560,989 | 12/1985 | Radochonski et al. | 346/1.1 |
| 4,571,604 | 2/1986 | Schiebel | 346/161 |
| 4,578,331 | 3/1986 | Ikeda et al. | 346/160 X |
| 4,627,712 | 12/1986 | Usami | 355/14 |
| 4,657,377 | 4/1987 | Takahashi | 355/14 |

Primary Examiner—Patrick R. Salce
Assistant Examiner—Marc S. Hoff

[57] ABSTRACT

A control system for an electrophotographic exposure apparatus is characterized by a film sheet transport which carries a film sheet past a first and a second spaced position whereat the same portion of the film sheet is exposed to an imaging beam each having the same image information.

16 Claims, 4 Drawing Sheets

LINE SCANNER TO REDUCE BANDING

BACKGROUND OF THE INVENTION

1. Field of the Invention

This invention relates to electrophotography and more particularly to an improved scanning light exposure control system for use in an electrophotographic reproduction system.

2. Description of the Prior Art

Electrophotographic image reproduction systems have been in existence for a number of years. In general, such systems operate as follows. An imaging element comprising a photoconductive layer that upon exposure to actinic radiation becomes conductive allowing an accumulated charge on the element surface to selectively bleed through a conductive path is first charged with a uniform charge layer by passing such element under a source of ionizing radiation, e.g., a scorotron or other such corona charging device. The charged surface is then exposed to imagewise modulated actinic radiation, rendering the photoconductor layer conductive and discharging the accumulated charge. The term "actinic radiation" is construed to encompass not only photochemical activity but also the photoelectric effects described herein and the like.

In a continuous tone system, as contemplated herein, the amount of charge left on the imaging element surface is inversely proportional to the amount of actinic radiation received by the element. In this manner a pattern of electrostatic charges is produced on the imaging element forming a latent image corresponding to the imagewise modulated actinic radiation incident on the element. The magnitude of the electrostatic charge at any one point on the imaging element is inversely proportional to the intensity of the exposing actinic radiation.

The latent image may now be rendered visible by development using colored particles which preferably bear a static charge and which are attracted to the charge pattern on the imaging element. Depending on the desired result, the colored particles may bear a charge of the same polarity as the charge originally placed on the imaging element or an opposite polarity. If the charge polarities are the same and an appropriate bias electrode is used the colored particles are preferentially attracted to the areas from which the original charge has been bled away, producing a "dark" or "colored" area of intensity proportional to the original exposure. If the charge polarities are opposite, then the areas that received the least exposure to actinic radiation will attract the most particles. In the first instance there is an image reversal; the light tones appear dark and the dark tones appear light. In the second instance the image tones are reproduced the same as the original.

The colored particles may be in dry form or may be supplied in a dispersion in a carrier liquid. Generally referred to as toners, the colored particles or dispersions are well known in the art. Liquid toners tend to produce higher image resolution and are sometimes preferred for that advantage.

Following toning, the image may be viewed as such, dried, fused or transferred onto a receiving element or any combination of the above, as is well known in the art.

A problem in the reproduction of images using electrophotographic systems of the type described above is banding. Banding is the appearance of horizontal, vertical, or both, stripes of lighter or darker density which usually traverse the full width or length of the image. It is a problem particularly with scanning exposure sources which involve repeatedly traversing an information carrying, intensity modulated, beam of actinic radiation over the surface of an imaging element while the imaging element is driven in a direction generally perpendicular to the traversing beam direction.

The cause for these bands is twofold. Horizontal bands, that is, bands extending transversely to the direction in which the imaging element moves, are usually due to drive irregularities. The drive irregularities cause small variations in the speed of the imaging element which cause partial overlap of the beam and result in areas of the imaging element receiving higher or lower exposure to the actinic radiation. Vertical bands, that is, bands extending along the direction of movement of the imaging element, are generally attributed to irregularities in the actinic radiation source. In the case where a cathode ray tube (CRT) is used as an exposure source these irregularities are typically caused by non-uniformities in the phosphor layer used in the CRT to produce a luminous output. Both problems are most visible and distracting when a continuous tone image is being reproduced.

There is, thus, need for a scanning exposure source that produces imaging having reduced banding defects.

SUMMARY OF THE INVENTION

In accordance with the present invention there is provided a process and an apparatus for reducing banding in the creation of a latent image in an electrophotographic reproduction system. The apparatus has random and/or periodic noise associated therewith. The invention comprises producing at respective first and second spaced positions a first and a second imaging beam respectively representative of first and second representations of the same predetermined latent image. Each imaging beam contains approximately one-half of a predetermined magnitude of imaging radiation intensity. The imaging element is transported past the first and second positions to expose sequentially a same predetermined portion of the imaging element to the imaging beams. As a result banding effects due to the noise of the apparatus are reduced.

In a more detailed aspect of the present invention there is provided a process and an apparatus for exposing a moving imaging element to imagewise modulated actinic radiation generated in a line scanning apparatus comprising the use of a modulated scanning imaging beam to generate a scanned pattern covering the full area of the imaging element to be exposed, characterized in that each scanned portion of the exposed area of the imaging element has been scanned at least twice using a scanning beam generated in a different region of the scanning apparatus with each scanning beam having the same image information. Each beam contains approximately one-half of a predetermined magnitude of imaging radiation intensity.

BRIEF DESCRIPTION OF THE DRAWINGS

The invention will be be more fully understood from the following detailed description thereof, taken in conjunction with the accompanying drawings, which form a part of this application and in which.

DETAILED DESCRIPTION OF THE INVENTION

Figure 1:
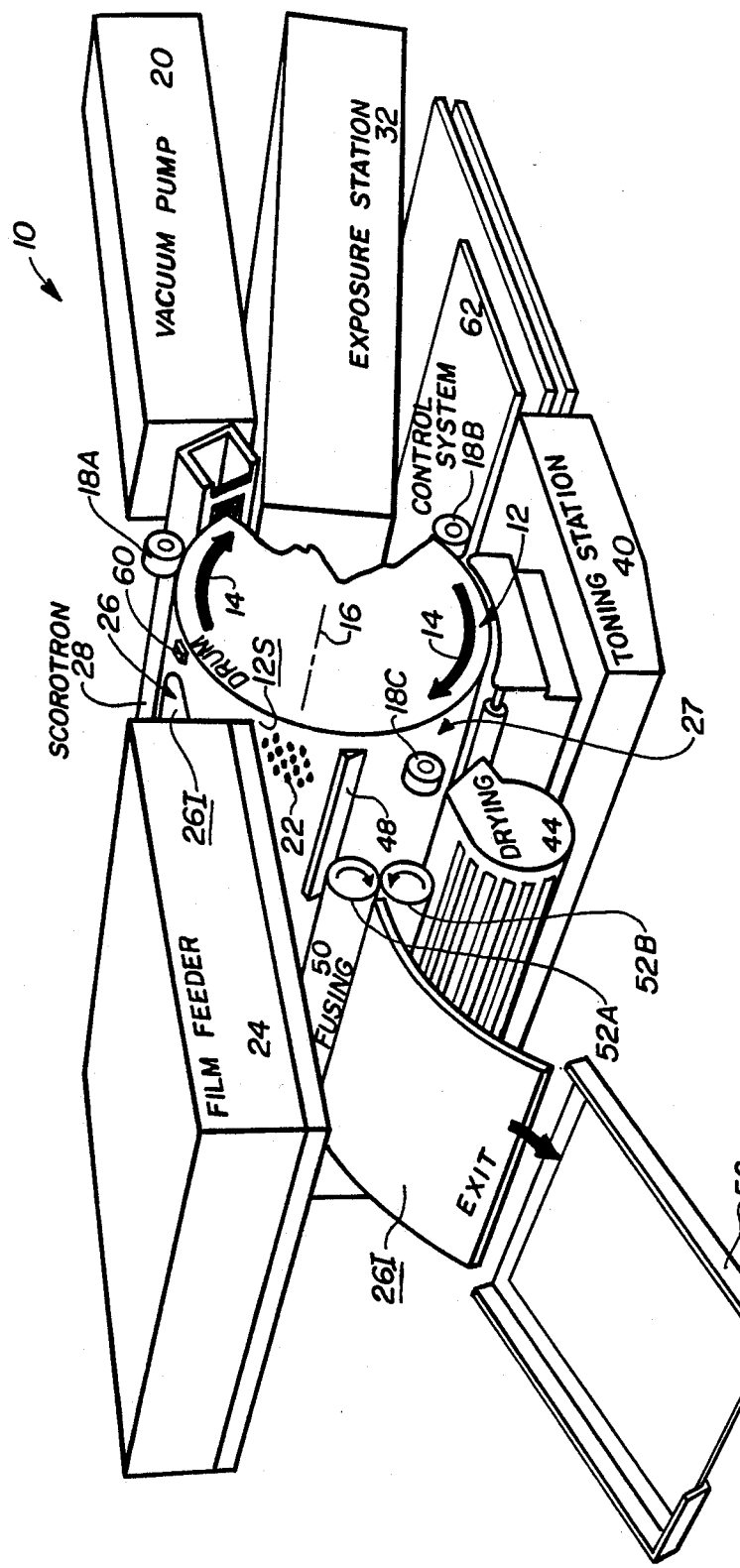
FIG. 1 is a stylized pictorial representation of an apparatus useful in the practice of the present invention.

Throughout the following detailed description similar reference numerals refer to similar elements in all figures of the drawings.

With reference to FIG. 1 shown is a stylized pictorial representation in perspective of an electrophotographic copying apparatus generally indicated by reference character 10 useful to expose an imaging element to imaging radiation and to implement the present invention. The apparatus 10 includes a drum 12 mounted for rotation in the direction of the arrow 14 about an axis of rotation 16. The drum 12 has a surface 12S. The drum is also provided with an array of conductive rollers of which three such rollers 18A, 18B and 18C are shown. The rollers 18 are connectible to a predetermined electrical potential, preferably ground. Means for holding a film sheet to the surface 12S of the drum 12 is provided. Suitable for use as the holding means is a vacuum holddown system including a vacuum pump 20 operatively connected in fluid communication with a plurality of holes 22 arranged in the surface 12S of the drum 12. It should be understood that any other suitable holding means may be used, such as, a properly placed clip arrangement.

A sheet film feeder 24 is disposed adjacent to the drum 12. The feeder 24 is adapted to dispense an electrophotographic imaging element 26, hereinafter referred to as the film sheet, onto the surface 12S of the drum 12. The film sheet 26 carries an imaging surface 26I thereon. The film sheet 26 is held in place by the holding means discussed above such that the imaging surface 26I faces outwardly away from the surface 12S of the drum 12 as the drum 12 transports the film sheet 26 along a path of transport 27 through the apparatus 10. The sheet 26 comprises two layers on a supporting base, usually seven mil (0.007 inches thick) polyester base. The outer of the two layers containing the imaging surface 26I is a photoconductive layer. The other layer is electrically conductive. A portion of the outer layer is removed along at least one edge thereof to define a strip of the conductive layer. A conductive paint is placed on the exposed strip of the conductive layer so as to permit the conductive layer to be grounded through contact with the rollers 18A, 18B or 18C as the film sheet 26 is transported along the path of transport 27.

A scorotron or other corona-type charging device 28 is placed adjacent to the drum 12 downstream in the direction of rotation shown by the arrow 14 from the film feeder 24. The scorotron charging device 28 is operative to apply a uniform electrostatic charge over the entire imaging surface 26I of the film sheet 26.

An exposure station 32 is located adjacent to the drum 12 downstream in the direction of the arrow 14 from the charging device 28. The exposure station 32, which is discussed in more detail herein, includes a source of radiant energy in the form of modulated actinic radiation. The term "actinic radiation" is construed to encompass not only photochemical activity, but also the photoelectric effects described herein and the like.

Next following the exposure station 32 in the direction of the arrow 14 is a toning station 40. The toning station 40 is implemented in the preferred instance by a conventional liquid toner applicator of the type sold by Imagen Corporation as part number AG3-0054-020, milled to conform to the curvature of the drum 12. A D.C. motor is preferably substituted for the original A.C. drive motor and a passive roller is given an active drive. A drying station 44 typically comprising an air blower is located adjacent to the toning station 40.

A stripping means indicated by reference character 48 is supported in an operative position along the path of transport 27 of the film sheet 26 to strip and to guide an exposed and imaged film sheet 26 from the surface 12S of the drum 12 to a fusing station 50. The stripping means 48 preferably takes the form of a vacuum release mechanism. The fusing station 50 typically comprises a pair of pressure rollers 52A, 52B. Depending upon the particular toner used at least one of the pair of rollers 52 may be heated to assist in the fusing of the toner. A film sheet receiving tray 56 is provided to receive an imaged film sheet 26 exiting from the fusing station 50.

A film sheet location sensor 60 operatively associated with the drum 12 is provided to monitor the location of an advancing film sheet 26 along the transport path 27. Suitable for use as the sensor 60 is an LED light source and an associated phototransistor. The sensor 60 may be placed at any convenient location along the path of transport 27 upstream of the scorotron 28.

An electronic scanning control system 62, discussed in more detail herein, is provided to control the operative elements of the exposure station 32.

Figure 2:
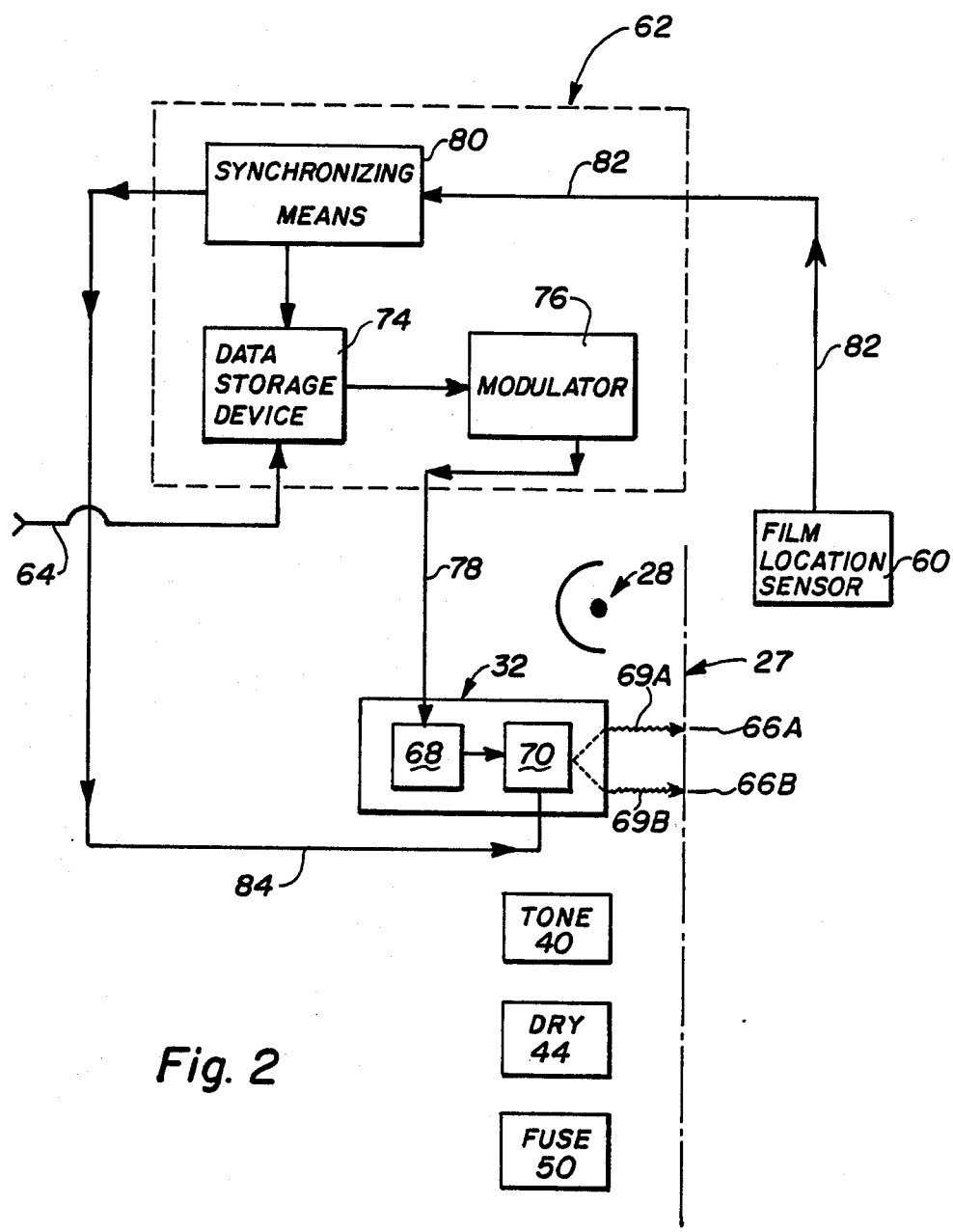
FIG. 2 is a functional block diagram of the apparatus of FIG. 1 useful in practicing the present invention.

The operation of the exposure apparatus 10 may be best understood in connection with FIGS. 1 and 2 in which the latter is a simplified functional block diagram of the main elements of the apparatus used in the generation of an image on the surface 26I of the film sheet 26 in accordance with the present invention.

In operation, upon command through an input line 64 a film sheet 26 is released from the feeder 24 onto the surface 12S of the rotating drum 12. The film sheet 26 is held onto the drum 12 by the action of the vacuum pump 20 through the holes 22. The film sheet 26 is then uniformly charged over its surface 26I by the action of the scorotron 28. The charged film sheet 26 is transported along the path 27 past predetermined first and second scanning position lines 66A and 66B, respectively, proximal to the exposure station 32. At the station 32 the film sheet is imagewise exposed to actinic radiation of varying intensity in a manner to be discussed. The exposure station 32 includes a source 68 of actinic radiation and directing means 70 for deflecting an imaging beam 69A, 69B of actinic radiation respectively toward each of the scanning position lines 66A and 66B. As a result of this imagewise exposure the surface 26I of the film sheet 26 is selectively discharged in proportion to the intensity of the incident radiant energy leaving on the surface 26I of the film sheet 26 a charge pattern of various intensities representative of a latent image.

The latent image is rendered visible by toning. Toning occurs in the toning station 40 where the surface is preferably immersed in a pool of liquid toner. Toner particles are attracted to the charged pattern on the surface 26I in proportion to the charge intensity on that surface. The surface 26I of the toned film sheet 26 is dried of any residual liquid at the drying station 44, stripped from the drum by the stripping means 48, and the toner image in permanently fixed onto the surface 26I in fusing station 50.

The electronic scanning control system 62 comprises a data storage device 74 connected at its output to a modulator 76. The modulator 76 is connected through a functional line 78 to the source 68 of actinic radiation. The data storage device 74 is operative on command over an input line 64 to store and to retrieve image data in a digital form. The storage device 74 contains a digital representation of the intensity of each of a predetermined number of picture elements, or "pixels", corresponding to an image to be reproduced. This representation is in the form of a predetermined number of lines, each line containing a predetermined number of pixels. Each intensity level is converted in the modulator 76 to a signal on the line 78 that controls the intensity level of the beam of the actinic radiation output from the source 68. The data storage device 74 may also include functional elements enabling it to receive the digital data representative of the image from a remote source. It may also include an input/output interface for operator control.

A synchronizing means 80 is operatively connected to the location sensor 60 over a line 82 and to the directing means 70 in the exposure source 32 over line 84. The synchronizing means 80 is operative to select the appropriate line of pixels stored in the data storage device 74 for modulating the imaging beam when the imaging beam is directed toward the appropriate one of the scanning position lines 66A or 66B. The imaging beam is directed toward the appropriate scanning position line 66A or 66B by the directing means 70 under the control of the synchronizing means 80. In practice the synchronizing means 80 responds to the signal representative of the film sheet location on the line 82 to produce at appropriate times, as measured by a clock internal to the synchronizing means 80, an output control signal over the line 84 to cause the beam to be directed toward the desired scanning position line 66A or 66B.

Figure 3:
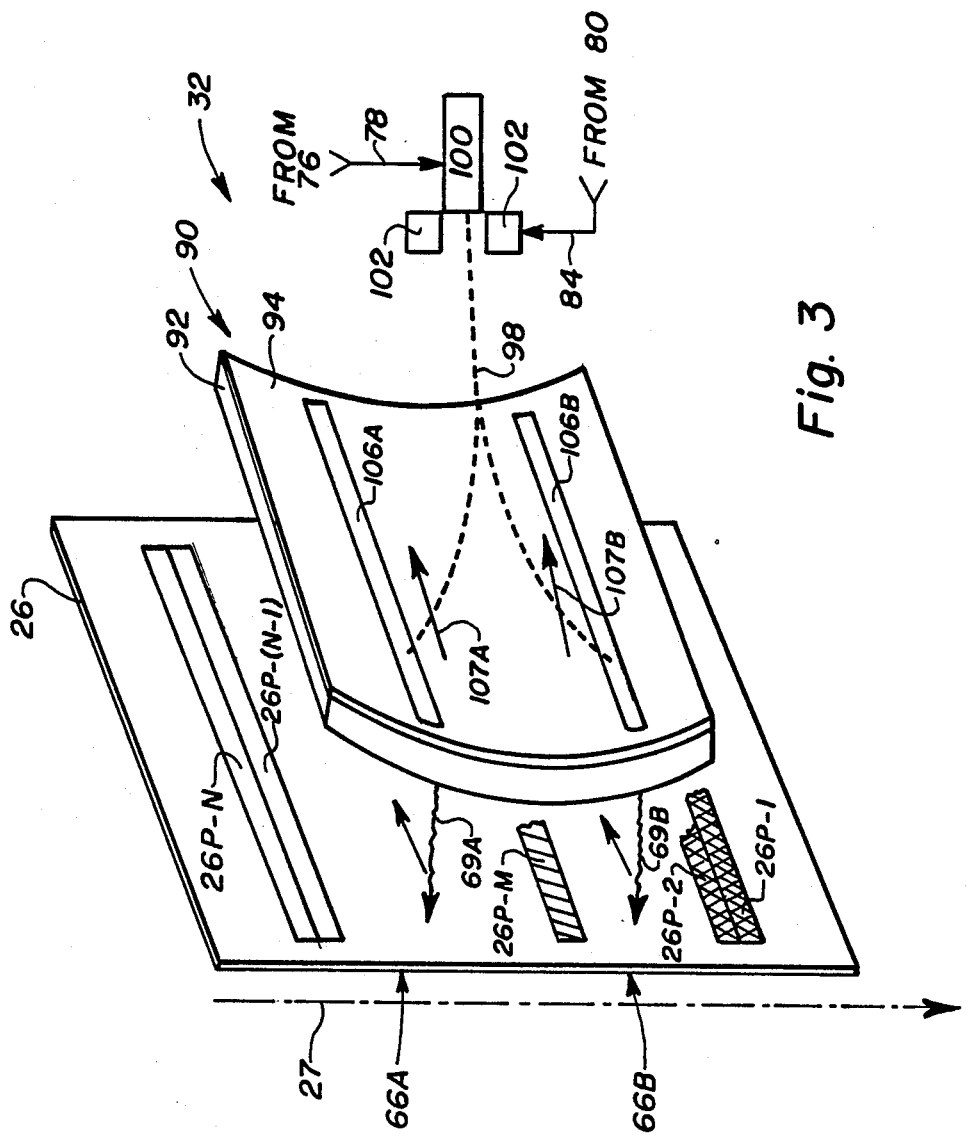
FIG. 3 is a stylized representation of a CRT line scanning exposure source in accordance with the present invention.

The operation of this system will now be discussed in connection with a preferred embodiment of the exposure source 32 shown in FIG. 3. In FIG. 3 the exposure station 32 takes the form of a conventional cathode ray tube 90 having a fiber optic faceplate 92. The interior of the faceplate 92 is covered with a phosphor layer 94. The phosphor in the layer 94 is excited by a beam 98 of electrons emitted from a cathode 100. The excitation beam 98 is deflected by a system of yokes 102 in response to the control signal from the synchronizing means 80 on the line 84 to scan alternately two lines across two spaced regions 106A, 106B of the phosphor layer 94 on the faceplate 92. As the beam 98 is directed toward either of the regions 106A or 106B the horizontal sweep of the beam in the directions 107A or 107B, respectively, is controlled by conventional horizontal deflecting yokes (and associated control circuitry, not shown). The regions 106A, 106B are spaced from each other a predetermined number of beam widths and are substantially parallel to each other. Light emitted from the phosphor layer 94 as a result of the scanning thereof by the electron beam 98 is transmitted through the fiber optic faceplate 92. Light transmitted through the faceplate 92 produces the first and second imaging beams 69A, 69B at the first and second scanning position lines 66A and 66B, respectively. Each imaging beam 69A, 69B contains a predetermined percentage (approximately fifty percent) of a predetermined magnitude of imaging beam intensity dependent primarily on the photoresponsive property of the film sheet 26, as will be discussed.

The imaging element 26 is advanced along the path of transport 27 at a constant rate in a direction transverse to the scanning position lines 66A and 66B to bring a first predetermined portion 26P-1 of the film sheet 26 under the first scanning position line 66A. The imaging beam 69A is modulated with image bearing information as to the electron beams 98 scans across the region 106A of the phosphor layer 94 when the first predetermined portion 26P-1 of the film sheet 26 is under the first scanning position line 66A. The imaging beam 69A contains one-half of the predetermined magnitude of imaging beam intensity necessary to properly expose the first portion of the film sheet. Thus a first intermediate scanned line is produced on the first predetermined portion 26P-1 of the film sheet 26.

The film sheet 26 is further advanced along the path of transport 27 to bring a second predetermined portion 26P-2 of the film sheet 26 under the first scanning position line 66A. The first imaging beam 69A is then again modulated with image bearing information (when the electron beam 98 again scans the first region 106A of the phosphor layer 94) to produce on the film sheet 26 at the second portion 26P-2 a second intermediate scanned line. This imaging beam 69A also contains one-half of the predetermined magnitude of imaging beam intensity that is necessary to properly expose this second portion of the film sheet.

Still further advance of the film sheet 26 will bring successive portions 26P-3, 26P-4, . . . 26P-M, . . . 26P-(N-1), and 26P-N (where N is the total number of portions of the film sheet 26, with M being less than N) under the first scanning position line 66A. Until the first portion 26P-1 of the film sheet 26 is transported to the second scanning position line 66B the beam 98 is turned off and does not excite the phosphor 94 in the region 106B.

As the film sheet 26 advances along the path of transport 27 the first portion 26P-1 of the film sheet 26 is eventually brought beneath the second scanning position line 66B. Some other one of the portions of the film sheet, e.g., the portion 26P-M, may then be located under the first scanning position line 66A. The synchronizing means 80 causes the image information corresponding to the M-th portion of the sheet 26 to be scanned across the portion 26P-M then under the scanning position line 66A and causes the information corresponding to the first intermediate scanned line (that is, the same image information as that used on the first portion 26P-1 when it was under the scanning position 66A) to modulate the imaging beam 69B scanning across the scanning position line 66B. Each imaging beam 69A and 69B contains one-half of the necessary intensity magnitude necessary to properly expose the image on the portions 26P-M and 26P-1, respectively. As a result a first intermediate scanned line is produced on the portion 26P-M and a final scanned line is formed on portion 26P-1. The same process repeats as the film sheet 26 is advanced along the path 27 with the appropriate information being scanned across the appropriate portions of the film sheet 26 when the same are located at the appropriate scanning position line 66A or 66B. In this manner final scanned lines are formed on each portion of the film sheet 26.

It is appreciated that in accordance with the present invention each portion 26P-1 through 26P-N of the film sheet 26 is scanned twice with the same image information. However, as will be discussed, because the imaging beam is produced at a different region of the phosphor layer the noise component (to be defined) of the beam due to phosphor irregularities is different in each imaging beam respectively. Also because each portion of the film sheet is scanned twice at two distinct times the noise component attributable to film sheet drive irregularities is also different. It should be understood that with appropriate modification the same portion of the film sheet may be scanned more than twice and remain within the contemplation of the present invention.

Figure 4:
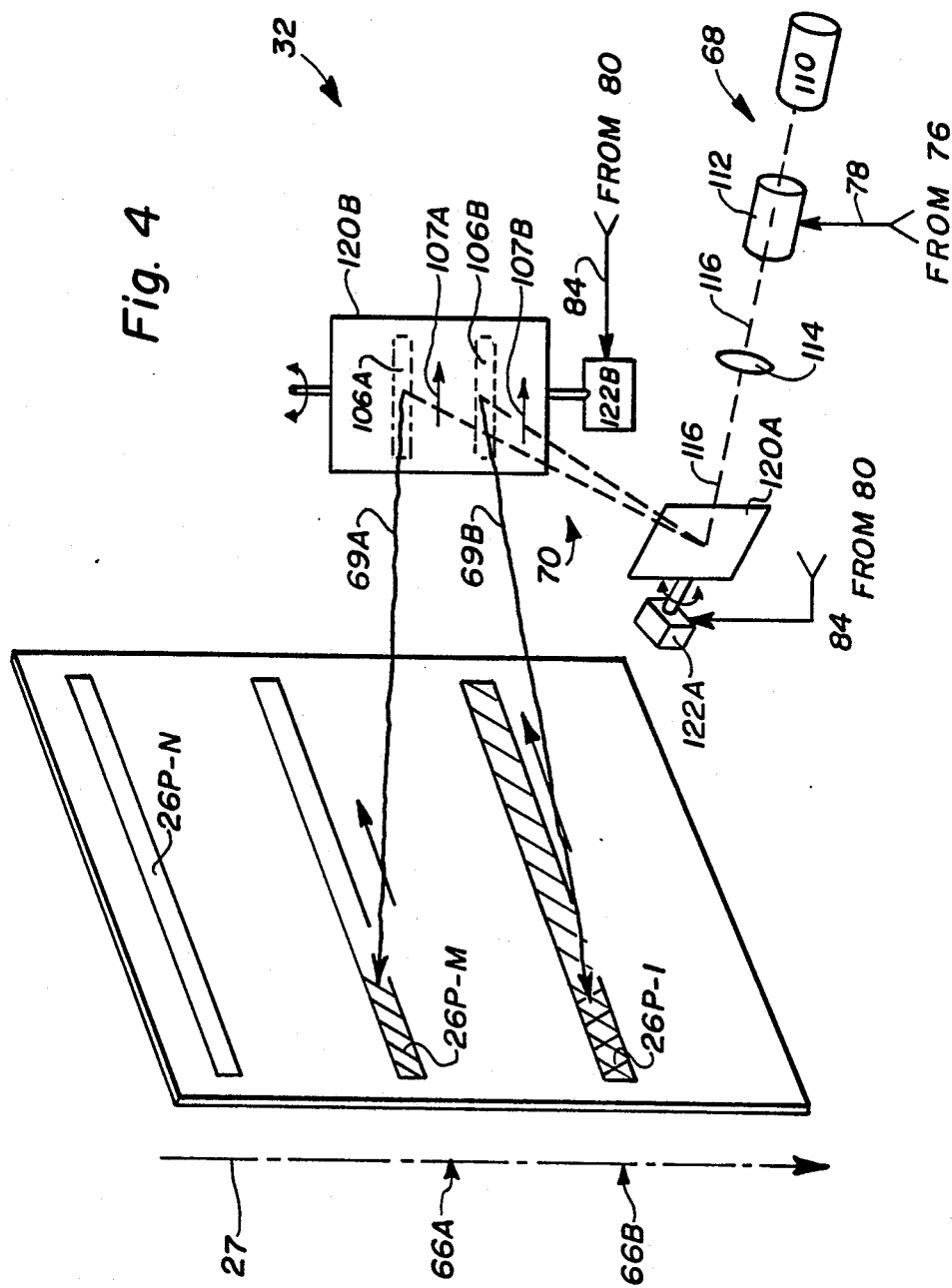
FIG. 4 is a stylized representation of a laser line scanning exposure source in accordance with the present invention.

Shown in FIG. 4 is an alternate embodiment of the exposure station 32 in which the source 68 takes the form of a coherent radiation source, such as a helium-neon laser 110. The laser 110 includes an acoustomodulator 112 connecting to the modulating means 76 over the line 78. A lens 114 focuses the modulated radiation beam 116 from the laser 110 and directs the same toward a first oscillating mirror 120A and then toward a second oscillating mirror 120B. The mirrors 120A and 120B and the respective drives 122A and 122B therefor collectively form the directing means 70 in this embodiment of the exposure station 32. It should be understood that the relative positions of the mirrors 120A and 120B may be reversed. It should also be understood that a single reflecting mirror could be used in place of the two mirrors 120A and 120B. The imaging beams 69A and 69B respectively directed toward the scanning position lines 66A and 66B are produced by reflection from respective regions 106A and 106B on the surface of the second mirror 122. These imaging beams 69A and 69B exhibit the imaging radiation intensity relationships as discussed in connection with FIG. 3. The beams 69A and 69B in FIG. 4 serve to scan the film sheet 26 being transported on the path 27 in the same manner as discussed in connection with FIG. 3.

As should be appreciated from the foregoing discussion the intensity of the imaging beam for each scan across the same portion of the film sheet is inversely proportional to the number of times that the portion of the film sheet is scanned. For example, if the film sheet is scanned by an imaging beam at each of S spaced scanning positions, each imaging beam contains approximately 1/S of the magnitude of imaging beam intensity necessary to properly expose the portion of the film sheet based primarily upon the photoresponsive property of the film sheet 26. In the embodiments of the invention discussed herein in connection with FIGS. 3 and 4 since there are two scanning position lines 66A and 66B each imaging beam 69A and 69B respectively contains approximately one-half of the predetermined magnitude of the imaging radiation intensity necessary to fully expose a given portion of the film sheet (i.e., necessary to produce a final scanned line on that portion of the film sheet).

In operation the apparatus 10 described in the Figures has noise associated with it which is manifested on the final toned image. As used herein the term "noise" includes both random and periodic perturbations produced by the electrophotographic exposure apparatus. The periodic noise is caused in each case by film sheet transport drive irregularities. The random noise may be caused, for example, by imperfections in the regions 106A and 106B in the phosphor layer 94 and the fiber optic faceplate 92 (for the embodiment of FIG. 3) or by imperfections in the laser optics and modulating system (for the embodiment of FIG. 4). Whatever the source of the noise, however, by scanning the same portion of the film sheet 26 with a predetermined number of imaging beams (each with commensurately reduced intensity), each containing the same image information, the effects of the noise on the final image tends to diminish. The diminution in random noise is proportional to the square root of the number S of times that the same portion of the film sheet is scanned. The diminution in the periodic noise is attributable to an increase in the frequency of this noise. This frequency increase is directly proportional to the number S of times that the same portion of the film sheet is scanned. As the frequency of the periodic noise component is increased, and because each scan is performed at a reduced lesser intensity (1/S) the effects of the periodic noise is less discernible to a viewer. All of these factors cooperate to produce the beneficial effect of substantially reducing banding, resulting in improved toned images.

In the preferred embodiment of the present invention the functional elements 74, 76 and 80 are implemented in a computer system using a Motorola M68000 microprocessor as the central processing unit. A computer program of eighteen pages, A-1 through A-18, in M68000 assembly and "C" source language whereby these functions are performed is appended to and forms part of this application. While the invention has been described in terms of an electrophotographic image reproduction system the same principles are applicable to all imaging systems where an image is reproduced on an imaging element by scanning an imaging beam over the surface of the element.

Those skilled in the art, having the benefit of the teaching of the present invention as hereinabove set forth, may effect numerous modifications thereto. It should be understood that those modifications are to be construed as lying within the scope of the present invention as defined by the appended claims.

```
 1                    ***********************************************************
 2                    *     TSS CONTROL AND IMAGING PROGRAM FOR TEP PROCESSOR RSNA#1
 3                    *     WRITE TWICE   TEN LINES APART WITH FEED SEQUENCE
 4                    *
 5                    *     KHB,MAM,AS           10-31-86
 6                    ***********************************************************
 7          00242000           ORG     $242000
 8  00242000 4FFAFFFE  START   LEA     START(PC),A7      INIT STACK POINTER
 9  00242004 45F900FF4087      LEA     $FF4087,A2        POINTER TO DIO CARD DATA DIREC REG
10  0024200A 61000745          BSR     CLRPORT           SET PORT 0 TO OUTPUT AND CLEAR OUTPUTS
11  0024200E 45F900FF4088      LEA     $FF4088,A2        POINTER TO DIO CARD PORT 0 OUTPUTS
12  00242014 6100072A          BSR     HOMESENS          LOOK AT HOME SENSOR
13  00242018 08010001          BTST    #1,D1
14  0024201C 66000022          BNE     RESTART           AT HOME POSITION
15  00242020 4BFA025F          LEA     HOM1(PC),A5       MOVE DRUM HOME MESSAGE
16  00242024 4DFA029A          LEA     HOM2(PC),A6
17  00242028 4E4F              TRAP    #15
18  0024202A 0005              DC.W    OUTPUT
19  0024202C 6100082A          BSR     BEEP5             5 BEEP
20  00242030 6100076C          BSR     TRANSFOR          FORWARD TRANSPORT DRIVE
21  00242034 6100074C          BSR     TRANSON
22  00242038 6100070C          BSR     HOMESEE           LOOK FOR HOME SENSOR
```

| # | Address | Code | Label | Op | Operand | Comment |
|---|---|---|---|---|---|---|
| 23 | 0024203C | 6100074E | | BSR | TRANSOFF | |
| 24 | 00242040 | 4BFA0206 | RESTART | LEA | H1(PC),A5 | HELLO MESSAGE |
| 25 | 00242044 | 4DFA023B | | LEA | H2(PC),A6 | |
| 26 | 00242048 | 4E4F | | TRAP | #15 | |
| 27 | 0024204A | 0006 | | DC.W | OUTPUT | |
| 28 | 0024204C | 13FC00000000 23AB | | MOVE.B | #0,PASS | CLEAR MEMORY LOCATION |
| 29 | 00242054 | 23FC00300000 000023AC | | MOVE.L | #IMG1BAS,IMAGEMEM | SETUP FOR FIRST IMAGE |
| 30 | 0024205E | 610004EC | | BSR | IMG_INIT | BLANK THE CRT AND CENTER IT |
| 31 | 00242062 | 610007A4 | | BSR | FSHTRON | TURN ON FUSING POWER |
| 32 | 00242066 | 610007B0 | | BSR | FSPEDON | TURN ON FUSING SPEED |
| 33 | 0024206A | 4BFA0254 | | LEA | STR1(PC),A5 | |
| 34 | 0024206E | 4DFA0277 | | LEA | STR2(PC),A6 | |
| 35 | 00242072 | 4E4F | | TRAP | #15 | |
| 36 | 00242074 | 0006 | | DC.W | OUTPUT | |
| 37 | 00242076 | 61000694 | | BSR | READGO | |
| 38 | 0024207A | 4BFA027F | | LEA | FPASS1(PC),A5 | |
| 39 | 0024207E | 4DFA0299 | | LEA | FPASS2(PC),A6 | FIRST PASS MESSAGE |
| 40 | 00242082 | 4E4F | | TRAP | #15 | |
| 41 | 00242084 | 0006 | | DC.W | OUTPUT | |
| 42 | 00242086 | 4BFA025F | RERESTRT | LEA | FFSA1(PC),A5 | |
| 43 | 0024208A | 4DFA026F | | LEA | FFSA2(PC),A6 | |
| 44 | 0024208E | 4E4F | | TRAP | #15 | |
| 45 | 00242090 | 0006 | | DC.W | OUTPUT | |
| 46 | 00242092 | 61000816 | | BSR | FEEDFILM | INITIATE FILM FEED |
| 47 | 00242096 | 61000750 | | BSR | VACUMON | TURN ON VACUUM |
| 48 | 0024209A | 610006E6 | | BSR | TRANSON | |
| 49 | 0024209E | 7E0D | | MOVE.L | #13,D7 | 14 TRANSITIONS BETWEEN LAY DOWN AND START OF SCOROTRON |
| 50 | | | * | | | LOOK FOR WHITE FIRST |
| 51 | 002420A0 | 1A3C0001 | | MOVE.B | #$01,D5 | |
| 52 | 002420A4 | 61000884 | | BSR | COUNTER | |
| 53 | 002420A8 | 610005E2 | | BSR | TRANSOFF | |
| 54 | 002420AC | 61000752 | | BSR | VACUMOFF | |
| 55 | 002420B0 | 4BFA0286 | | LEA | WGB1(PC),A5 | |
| 56 | 002420B4 | 4DFA02A4 | | LEA | WGB2(PC),A6 | |
| 57 | 002420B8 | 4E4F | | TRAP | #15 | |
| 58 | 002420BA | 0006 | | DC.W | OUTPUT | |
| 59 | 002420BC | 610006FC | | BSR | RDYLTON | TURN ON READY LIGHT |
| 60 | 002420C0 | 6100064A | | BSR | READGO | READ THE GO BUTTON |
| 61 | 002420C4 | 610006FE | | BSR | RDYLTOFF | TURN OFF READY LIGHT |
| 62 | 002420C8 | 4BFA0290 | | LEA | GOB1(PC),A5 | |
| 63 | 002420CC | 4DFA029E | | LEA | GOB2(PC),A6 | MESSAGE AFTER GO BUTTON |
| 64 | 002420D0 | 4E4F | | TRAP | #15 | |
| 65 | 002420D2 | 0006 | | DC.W | OUTPUT | |
| 66 | 002420D4 | 61000712 | | BSR | VACUMON | |
| 67 | 002420D8 | 7E09 | | MOVE.L | #9,D7 | ONE SECOND TILL VACUUM PULLS DOWN |
| 68 | 002420DA | 61000620 | | BSR | SECOND | |
| 69 | 002420DE | 610006A2 | | BSR | TRANSON | TURN ON DC MOTOR |
| 70 | 002420E2 | 610006C4 | | BSR | CHARGON | TURN ON SCOROTRON |
| 71 | 002420E6 | 7E02 | | MOVE.L | #2,D7 | 3 TRANSITIONS BETWEEN CHARGEON AND DRYER ON |
| 72 | | | * | | | LOOK FOR WHITE FIRST |
| 73 | 002420E8 | 1A3C0001 | | MOVE.B | #$01,D5 | |
| 74 | 002420EC | 6100083C | | BSR | COUNTER | |
| 75 | 002420F0 | 610007B2 | | BSR | FILMSENS | CHECK FILM PRESENCE SENSOR AT SCOROTRON |
| 76 | 002420F4 | 08010003 | | BTST | #3,D1 | CHECK FILM PRESENCE BIT |
| 77 | 002420F8 | 67000054 | | BEQ | FILMPASS | FILM IS SENSED |
| 78 | 002420FC | 610006B2 | | BSR | CHARGOFF | |
| 79 | 00242100 | 610006FE | | BSR | VACUMOFF | |
| 80 | 00242104 | 4BFA0283 | | LEA | FFE1(PC),A5 | |
| 81 | 00242108 | 4DFA02A1 | | LEA | FFE2(PC),A6 | FILM FEED ERROR MESSAGE |
| 82 | 0024210C | 4E4F | | TRAP | #15 | |
| 83 | 0024210E | 0006 | | DC.W | OUTPUT | |
| 84 | 00242110 | 6100067A | | BSR | TRANSOFF | |
| 85 | 00242114 | 6100067E | | BSR | TRANSREV | REVERSE TRANSPORT DRIVE |
| 86 | 00242118 | 7E02 | | MOVE.L | #2,D7 | 300MS TO LET DRUM STOP |
| 87 | 0024211A | 610005E0 | | BSR | SECOND | |
| 88 | 0024211E | 61000662 | | BSR | TRANSON | |
| 89 | 00242122 | 61000734 | | BSR | BEEPS | FIVE BEEPS IS FAILURE SIGNAL |
| 90 | 00242126 | 6100061E | | BSR | HOMESEE | SEND TRANSPORT HOME |
| 91 | 0024212A | 7E13 | | MOVE.L | #19,D7 | REVERSE DRIVE TRANSPORT 1.0 INCH PAST HOME SENSOR (2 SECONDS) |
| 92 | 0024212C | 610005CE | | BSR | SECOND | |
| 93 | 00242130 | 6100065A | | BSR | TRANSOFF | |
| 94 | 00242134 | 7E04 | | MOVE.L | #4,D7 | 500 MS TO LET TRANSPORT STOP |
| 95 | 00242136 | 610005C4 | | BSR | SECOND | |
| 96 | 0024213A | 61000662 | | BSR | TRANSFOR | FORWARD TRANSPORT DRIVE |
| 97 | 0024213E | 61000642 | | BSR | TRANSON | |
| 98 | 00242142 | 61000602 | | BSR | HOMESEE | SEND TRANSPORT HOME |
| 99 | 00242146 | 61000644 | | BSR | TRANSOFF | |
| 100 | 0024214A | 6000FEF4 | | BRA | RESTART | RESTART PROCESS |
| 101 | | | | | | |
| 102 | 0024214E | 7E09 | FILMPASS | MOVE.L | #9,D7 | 10 TRANSITIONS BETWEEN DRYERON AND THE START OF IMAGING |
| 103 | | | * | | | LOOK FOR WHITE FIRST |
| 104 | 00242150 | 1A3C0001 | | MOVE.B | #$01,D5 | |
| 105 | 00242154 | 610007D4 | | BSR | COUNTER | |
| 106 | 00242158 | 7E00 | | MOVE.L | #0,D7 | 100 MS DELAY |
| 107 | 0024215A | 610005A0 | | BSR | SECOND | |
| 108 | 0024215E | 610006B0 | | BSR | FSHTROFF | TURN OFF FUSING POWER |
| 109 | | | | | | |
| 110 | 00242162 | 6100066A | | BSR | TONERON | TURN ON TONER PUMP |
| 111 | | | * | BSR | DRYERON | TURN ON DRYER |
| 112 | 00242166 | 00000022 | | OR.B | #$22,D0 | SET DEV ELEC. AND DRYER BITS IN D3 (IMAGE WILL TURN ON THESE BITS ON PORT 3) |
| 113 | | | * | | | |
| 114 | 0024216A | 61000244 | | BSR | IMAGE | CRT EXPOSURE |
| 115 | 0024216E | 5239000023AB | | ADD.B | #1,PASS | INCREMENT PASS COUNTER |
| 116 | 00242174 | 61000692 | | BSR | FSHTRON | TURN ON FUSING POWER |
| 117 | 00242178 | 61000636 | | BSR | CHARGOFF | TURN OFF SCOROTRON |
| 118 | 0024217C | 7E02 | | MOVE.L | #2,D7 | 3 TRANSITIONS BETWEEN END OF IMAGING AND AIR PULSE |
| 119 | | | * | | | LOOK FOR WHITE FIRST |
| 120 | 0024217E | 1A3C0001 | | MOVE.B | #1,D5 | |
| 121 | 00242182 | 610007A6 | | BSR | COUNTER | |
| 122 | 00242186 | 610006A0 | | BSR | AIRPULSE | PULSE SOLENOID VALVE TO LIFT FILM |
| 123 | 0024218A | 7E02 | | MOVE.L | #2,D7 | 3 TRANSITIONS BETWEEN END OF AIRPULSE |

```
124
125   0024218C 163C0001           MOVE.B    #1,D3                AND FUSING CAM MOTOR DOWN
126   00242190 61000798           BSR       COUNTER              LOOK FOR WHITE FIRST
127   00242194 610006D2           BSR       CAMDOWN
128   00242198 7E13                MOVE.L    #19,D7               TURN FUSING CAM MOTOR TO LOWER ROLLER
129                                                               20 TRANSITIONS BETWEEN END OF AIR PULSE
130   0024219A 1A3C0001           MOVE.B    #1,D5                AND TONER/DEV ELEC OFF
131   0024219E 6100078A           BSR       COUNTER              LOOK FOR WHITE FIRST
132   002421A2 6100063A           BSR       DEVELOFF
133   002421A6 6100062E           BSR       TONEROFF             TURN OFF DEVELOPMENT ELECTRODE
134   002421AA 7E04                MOVE.L    #4,D7                TURN OFF TONER PUMP
135   002421AC 6100054E           BSR       SECOND               .5 SEC DELAY TO AVOID BLIPS
136   002421B0 61000594           BSR       HOMESEE
137   002421B4 7E1D                MOVE.L    #29,D7               WAIT FOR HOME SENSOR
138   002421B6 61000544           BSR       SECOND               CONTINUE MOVING TRANSPORT FOR ANOTHER 1.5
139   002421BA 610005D0           BSR       TRANSOFF             INCH(3 SECS) TO FREE FILM AT DRYER ROLLER
140   002421BE 7E04                MOVE.L    #4,D7                TURN OFF DC MOTOR
141   002421C0 6100053A           BSR       SECOND
142   002421C4 610005CE           BSR       TRANSREV             500 MS DELAY TO STOP DRUM
143   002421C8 610005B8           BSR       TRANSON              REVERSE TRANSPORT DRIVE
144   002421CC 61000578           BSR       HOMESEE
145   002421D0 7E13                MOVE.L    #19,D7
146   002421D2 61000528           BSR       SECOND               2 SECONDS IN REVERSE DIRECTION PAST HOME
147   002421D6 610005B4           BSR       TRANSOFF
148   002421DA 7E04                MOVE.L    #4,D7                TURN OFF DC MOTOR
149   002421DC 6100051E           BSR       SECOND
150   002421E0 610005BC           BSR       TRANSFOR             500 MS DELAY TO STOP DRUM
151   002421E4 6100059C           BSR       TRANSON              FORWARD TRANSPORT DRIVE
152   002421E8 6100055C           BSR       HOMESEE
153   002421EC 6100059E           BSR       TRANSOFF
154   002421F0 6100060E           BSR       VACUMOFF             TURN OFF VACUUM
155   002421F4 7E40                MOVE.L    #64,D7
156   002421F6 61000504           BSR       SECOND               6.5 SECONDS ADDT'L FOR DRYING
157   002421FA 6100057E           BSR       DRYEROFF             AND FUSING
158   002421FE 61000684           BSR       CAMUP
159   00242202 4BFA0168           LEA       CONG(PC),A5
160   00242206 4DFA0181           LEA       CONG2(PC),A6
161   0024220A 4E4F                TRAP      #15
162   0024220C 0006                DC.W      OUTPUT
163   0024220E 61000630           BSR       BEEP
164   00242212 6100062C           BSR       BEEP                 BEEP SUCCESSFUL COMPLETION
165   00242216 61000628           BSR       BEEP                 EACH BEEP IS 500 MSEC
166   0024221A 61000624           BSR       BEEP                 WITH NO WAIT IN
167                                                               BETWEEN
168   0024221E 0C3900020000       CMPI.B    #2,PASS              CHECK PASS #
               23AB
169   00242226 6700FE18           BEQ       RESTART              BRANCH FOR NEXT SHOW
170
171   0024222A 4BFA00ED           LEA       SPASS1(PC),A5        SECOND PASS MESSAGE
172   0024222E 4DFA0108           LEA       SPASS2(PC),A6
173   00242232 4E4F                TRAP      #15
174   00242234 0006                DC.W      OUTPUT
175   00242236 23FC00580000       MOVE.L    #IMAG2BAS,IMAGEMEM   SETUP FOR SECOND IMAGE
               000023AC
176   00242240 6100030A           BSR       IMG_INIT             INITIALIZE DMA, TIMER, LUT AND CRT
177
178   00242244 6000FE40           BRA       RERESTRT             BRANCH FOR SECOND IMAGE
179
180
181   00242248 0A0A0A0A0A0A  H1   DC.B      $A,$A,$A,$A,$A,$A,$A,$A,$A,$A,$A,$A,$A,$A,$A,$A,$A
182   0024225A 0A0A0A0A4D65       DC.B      $A,$A,$A,$A,'Medical Hardcopy RSNA #1 machine',$D,$A,$A
183            00242281      H2   EQU       *
184
185   00242281 0A0A0A0A0A0A  HOM1 DC.B      $A,$A,$A,$A,$A,$A,$A,$A,$A,$A,$A,$A,$A,$A,$A,$A,$A
186   00242293 0A0A0A0A4452       DC.B      $A,$A,$A,$A,'DRUM ROTATING TO HOME AFTER FILM ERROR',$D,$A,$A
187            002422C0      HOM2 EQU       *
188
189   002422C0 505245535320  STR1 DC.B      'PRESS GO BUTTON FOR INITIAL FILM FEED',$D,$A
190            002422E7      STR2 EQU       *
191
192   002422E7 46494C4D2046  FFSA1 DC.B     'FILM FEED SEQUENCE',$D,$A
193            002422FB      FFSA2 EQU      *
194
195   002422FB 424547494E4E  FPASS1 DC.B    'BEGINNING FIRST FILM PROCESS',$D,$A
196            00242319      FPASS2 EQU     *
197
198   00242319 424547494E4E  SPASS1 DC.B    'BEGINNING SECOND FILM PROCESS',$D,$A
199            00242338      SPASS2 EQU     *
200
201   00242338 505245535320  WGB1 DC.B      'PRESS GO BUTTON TO START IMAGING',$D,$A
202            0024235A      WGB2 EQU       *
203
204   0024235A 494D4147494E  GOB1 DC.B      'IMAGING SEQUENCE',$D,$A
205            0024236C      GOB2 EQU       *
206
207   0024236C 494D4147494E  CONG DC.B      'IMAGING SEQUENCE COMPLETED',$D,$A,$A
208            00242389      CONG2 EQU      *
209
210   00242389 0A0A2A2A2A2A  FFE1 DC.B      $A,$A,'*****  FILM FEED ERROR  *****',$D,$A,$A
211            002423AB      FFE2 EQU       *
212                          *
213                          *    EQUATES
214            00000000     MONITOR EQU    $0
215            00000001     INPUT    EQU   $1
216            00000006     OUTPUT   EQU   $6
217            00240000     DOSBASE  EQU   $240000
218   002423AB 00000001     PAS1     DS.B  1
219            000023AB     PASS     EQU   PAS1-DOSBASE
```

```
220           0000A000    ZLUT      EQU     $A000               Z LOOK-UP TABLE ADDRESS
221                       *         IMAGE MEMORY LAYOUT DEFINITIONS
222           0000010E    TM        EQU     270                 TOP MARGIN (IN LINES)
223           00000028    TCS       EQU     40                  TOP CENTER SPACE (IN LINES)
224           00000028    BCS       EQU     40                  BOTTOM CENTER SPACE (IN LINES)
225           00000028    BM        EQU     40                  BOTTOM MARGIN (IN LINES)
226           00000001    RC        EQU     1                   NUMBER OF TIMES TO REPEAT FRAME LINE
227           000001E0    FL        EQU     480*RC              TOTAL NUMBER OF LINES PER FRAME
228           00000726    PL        EQU     3*FL+TM+TCS+BCS+BM  TOTAL NUMBER OF LINES PER PAGE
229           00000047    LM        EQU     71                  LEFT MARGIN (IN PIXELS)
230           00000004    CS        EQU     4                   CENTER SPACE (IN PIXELS)
231           00000047    RM        EQU     71                  RIGHT MARGIN (IN PIXELS)
232           00000494    LL        EQU     LM+CS+RM+1024+2     NUMBER OF PIXELS PER LINE
233           00300000    IMAG1BAS  EQU     $300000             START OF FIRST IMAGE
234           00580000    IMAG2BAS  EQU     $580000             START OF SECOND IMAGE
235  002423AC 00000004    IMAGBASE  DS.L    1                   IMAGE BASE ADR STORAGE ADR
236           000023AC    IMAGEMEM  EQU     IMAGBASE-DOSBASE    PTR TO STORAGE ADR
237           0050B9F8    BLANKLIN  EQU     (IMAG1BAS+LL*PL+1)&$FFFFFFFE BLANK LINE
238                       *
239                       *
240                       *         DMA Controller Register Definitions
241                       *
242           00FF0800    DMABASE   EQU     $FF0800             BASE ADDRESS OF DMA BOARD
243           00000000    CHAN0     EQU     $0                  DMA CHANNEL 0
244           00000040    CHAN1     EQU     $40                 DMA CHANNEL 1
245           00000000    DMACSR    EQU     0                   DMA CHANNEL STATUS REGISTER
246           00000001    DMACER    EQU     1                   DMA CHANNEL ERROR REGISTER
247           00000004    DMADCR    EQU     4                   DMA DEVICE CONTROL REGISTER
248           00000005    DMAOCR    EQU     5                   DMA OPERATION CONTROL REGISTER
249           00000006    DMASCR    EQU     6                   DMA SEQUENCE CONTROL REGISTER
250           00000007    DMACCR    EQU     7                   DMA CHANNEL CONTROL REGISTER
251           0000000A    DMAMTC    EQU     $A                  DMA MEMORY TRANSFER COUNT
252           0000000C    DMAMAR    EQU     $C                  DMA MEMORY ADDRESS REGISTER
253           00000014    DMADAR    EQU     $14                 DMA DEVICE ADDRESS REGISTER
254           0000001A    DMABTC    EQU     $1A                 DMA BASE TRANSFER COUNT
255           0000001C    DMABAR    EQU     $1C                 DMA BASE ADDRESS REGISTER
256           00000025    DMANIN    EQU     $25                 DMA NORMAL INTERRUPT VECTOR REG
257           00000027    DMAEIN    EQU     $27                 DMA ERROR INTERRUPT VECTOR REG
258           0000002D    DMACPR    EQU     $2D                 DMA CHANNEL PRIORITY REGISTER
259           00000029    DMAMFC    EQU     $29                 DMA MEMORY FUNCTION CODE REGISTER
260           00000031    DMADFC    EQU     $31                 DMA DEVICE FUNCTION CODE REGISTER
261           00000039    DMABFC    EQU     $39                 DMA BASE FUNCTION CODE REGISTER
262           000000FF    DMAGCR    EQU     $FF                 DMA GENERAL CONTROL REGISTER
263                       *
264                       *
265                       *
266                       *         Timer Controller Register Definitions
267                       *
268           00FF0900    TMRDAT    EQU     $FF0900             TIMER DATA REGISTER (W)
269           00FF0902    TMRCTL    EQU     $FF0902             TIMER CONTROL REGISTER (W)
270           0000FF70    STRPXC    EQU     $FF70               START PIXEL CLOCK COMMAND
271           0000FFD0    STPPXC    EQU     $FFD0               STOP PIXEL CLOCK COMMAND
272           00FF0902    TMRSTA    EQU     $FF0902             TIMER STATUS REGISTER (W) DATA=LOW BYTE
273                       *
274                       *         Miscellaneous Register Definitions
275                       *
276           00FF0904    CRTY_C    EQU     $FF0904             CRT Y AND CONTROL REGISTER (W-WO)
277           00FF0904    DENSEL    EQU     $FF0904             DENSITY DATA (W-RO) DATA IN LOW BYTE
278           00FF0908    ZSEL      EQU     $FF0908             Z DATA OUTPUT REGISTER (W-WO)
279           00FF090C    FGCTL     EQU     $FF090C             FRAME-GRABBER CONTROL REGISTER (W-WO)
280           00FF0A00    LUTBASE   EQU     $FF0A00             LUT BASE ADDRESS
281                       *
282                       *
283           FFFFFFFF    BEAMOFF   EQU     $FFFFFFFF           DATA FOR CRT BEAM OFF
284           00000000    PXLOFF    EQU     $00000000           PIXEL DATA FOR CRT BEAM OFF
285                       *
286                       *
287                       *         REGISTER USAGE:
288                       *
289                       *         A0      PIXEL DATA (Z)
290                       *         A1      NOT USED
291                       *         A2      USED TO TURN ON DEVELOPMENT ELECTRODE
292                       *         A3      ADDRESS OF CRT Y AND CONTROL REGISTER (CRTY_C)
293                       *         A4      NOT USED
294                       *         A5      ADDRESS OF TIMER CONTROL REGISTER (TMRCTL)
295                       *         A6      ADDRESS OF DMA CONTROLLER (DMABASE)
296                       *
297                       *         D0      NEXT Y (IN LOW BYTE); CRT CONTROL (IN HIGH BYTE)
298                       *         D1      SAME AS ABOVE WITH "LOAD Y" BIT CLEARED
299                       *         D2      DMA ERRORS
300                       *         D3      NOT USED
301                       *         D4      NUMBER OF PIXELS/LINE (DMA TRANSFER COUNT)
302                       *         D5      CLEAR DONE BIT
303                       *         D6      DMA START AND INTERRUPT ENABLE BITS
304                       *         D7      LINES PER PAGE COUNTER
305                       *
306
307  002423B0 48E7FFFE    IMAGE     MOVEM.L D0-D7/A0-A6,-(SP)   SAVE REGISTERS
308  002423B4 40E7                  MOVE.W  SR,-(SP)
309  002423B6 46FC2000              MOVE.W  #$2000,SR
310  002423BA 610000DE              BSR     NXTLINIT            INITIALIZE NEXTLINE ROUTINE
311  002423BE 33FCFFFF00FF          MOVE.W  #BEAMOFF,ZSEL       MAKE SURE BEAM IS OFF
              0908
312  002423C6 4DF900FF0800          LEA     DMABASE,A6          ADDRESS OF DMA CONTROLLER
313  002423CC 2D4C000C              MOVE.L  A4,CHAN0+DMAMAR(A6) 1ST LINE TO IMAGE (FROM NXTLINIT)
314  002423D0 47F900FF0904          LEA     CRTY_C,A3
315  002423D6 3681                  MOVE.W  D1,(A3)             FIRST Y (FROM NXTLINIT)
316  002423D8 00410200              OR.W    #$200,D1            NOW LOAD Y
```

```
317   0024230C 3681              MOVE.W   D1,(A3)                   FIRST Y (FROM NXTLINIT)
318   0024230E 0241FDFF          AND.W    #$FDFF,D1                 TURN LOAD Y BACK OFF
319   002423E2 3681              MOVE.W   D1,(A3)
320   002423E4 1200              MOVE.B   D0,D1                     COPY NEXT Y
321   002423E6 4BF900FF0902      LEA      TMRCTL,A5                 ADDRESS OF TIMER CONTROL REGISTER
322   002423EC 4282              CLR.L    D2
323   002423EE 283C00000494      MOVE.L   #LL,D4
324   002423F4 3D44000A          MOVE.W   D4,CHAN0+DMAMTC(A6)
325   002423F8 2A3C00000080      MOVE.L   #$80,D5                   DONE BIT
326   002423FE 2C3C00000088      MOVE.L   #$88,D6                   START AND INTERRUPT ENABLE
327   00242404 2E3C00000E5F      MOVE.L   #((PL+LOFFSET)*NWRITES)-1,D7  SET LINES PER PAGE
328   0024240A 6100026E          BSR      DMACLR                    CLEAR OUT LAST COMMAND
329   0024240E 08160001   IMAGE1 BTST.B   #1,CHAN0+DMACSR(A6)       IN HORIZONTAL BLANKING INTERVAL?
330   00242412 67FA              BEQ      IMAGE1                    IF EQ NO
331   00242414 1D460007          MOVE.B   D6,CHAN0+DMACCR(A6)       YES - START TRANSFER
332   00242418 44FC0000          MOVE     #0,CCR                    CLEAR CARRY
333   0024241C 3ABCFF70          MOVE.W   #STRPXC,(A5)              START PIXEL CLOCK
334   00242420 60000016          BRA      IMAGE3
335   00242424 2D48000C   IMAGE2 MOVE.L   A0,CHAN0+DMAMAR(A6)
336   00242428 3D44000A          MOVE.W   D4,CHAN0+DMAMTC(A6)
337   0024242C 1D460007          MOVE.B   D6,CHAN0+DMACCR(A6)       CONTINUE TRANSFER
338   00242430 610000A2          BSR      NEXTLINE                  SET-UP NEXT LINE
339   00242434 44FC0000          MOVE.W   #0,CCR                    CLEAR CARRY
340   00242438 6400FFFE   IMAGE3 BCC      IMAGE3                    WAIT FOR INTERRUPT
341   0024243C 3680              MOVE.W   D0,(A3)                   NEXT Y
342   0024243E 3681              MOVE.W   D1,(A3)                   RESET LOAD Y
343   00242440 0C8700008FC       CMP.L    #2300,D7
344   00242446 67000018          BEQ      DEVELON
345   0024244A 51CFFFD8   CONTINU DBF     D7,IMAGE2                 DO ALL LINES
346   0024244E 3ABCFFD0          MOVE.W   #STPPXC,(A5)              YES, STOP PIXEL CLOCK
347   00242452 0241FEFF          AND.W    #$FEFF,D1                 DROP VIDEO ACTIVE
348   00242456 3681              MOVE.W   D1,(A3)
349   00242458 46DF              MOVE.W   (SP)+,SR
350   0024245A 4CDF7FFF          MOVEM.L  (SP)+,D0-D7/A0-A6         RESTORE REGISTERS
351   0024245E 4E75              RTS
352
353   00242460 45F900FF4088 DEVELON LEA   $FF4088,A2                DIO PORT 0 ADDRESS
354   00242466 1012              MOVE.B   (A2),D0                   READ DIO PORT
355   00242468 00000022          OR.B     #$22,D0                   TURN ON DRYER AND DEV ELEC BITS
356   0024246C 1480              MOVE.B   D0,(A2)                   TURN THEM ON
357   0024246E 60DA              BRA      CONTINU
358
359                         *
360                         *
361                         * INTERRUPT SERVICE ROUTINE
362                         *
363   00242470 3416       INTSERV MOVE.W  CHAN0+DMACSR(A6),D2
364   00242472 1C85              MOVE.B   D5,CHAN0+DMACSR(A6)       RESET DONE
365   00242474 0802000C          BTST     #12,D2
366   00242478 6600000E          BNE      INTSVCA
367   0024247C 1D7C00000007      MOVE.B   #0,CHAN0+DMACCR(A6)       DISABLE INTERRUPTS
368   00242482 00570001          ORI.W    #1,(SP)                   SET CARRY BIT
369   00242486 4E73              RTE
370
371   00242488 48F8FFFF6000 INTSVCA MOVEM.L D0-D7/A0-A7,$6000
372   0024248E 40F86040          MOVE.W   SR,$6040
373   00242492 31FCFFFF6042      MOVE.W   #$FFFF,$6042
374   00242498 60FE              BRA      *
375
376                         *
377                         *
378                         * SET-UP DATA FOR NEXT IMAGE LINE
379                         *
380                         *       NXTLINIT INITIALIZE NEXTLINE ROUTINE AND SET-UP FIRST LINE
381                         *       NEXTLINE SET-UP NEXT IMAGE LINE
382                         *
383                         *   REGISTER USAGE:
384                         *
385                         *       A0       PIXEL DATA (Z)
386                         *       A2       ADDRESS OF REGISTER SAVE AREA
387                         *       A3       ADDRESS OF Y DEFLECTION DATA TABLE
388                         *       A4       ADDRESS OF NEXT LINE FOR LOW Y
389                         *       A5       ADDRESS OF NEXT LINE FOR HIGH Y
390                         *       A6       ADDRESS OF ROUTINE FOR NEXT PART OF IMAGE
391                         *
392                         *       D0       NEXT Y (IN LOW BYTE)
393                         *       D4       INCREMENT TO NEXT LINE FOR LOW Y
394                         *       D5       INCREMENT TO NEXT LINE FOR HIGH Y
395                         *       D6       LINE REPEAT COUNTER (2)
396                         *       D7       COUNT OF LINES IN CURRENT IMAGE SECTION (20,1800,20)
397                         *
398
399            00000002 NWRITES EQU      2                          NUMBER OF TIMES TO WRITE EACH LINE
400            0000000A LOFFSET EQU      10                         DISTANCE BETWEEN THE TWO LINES
401
402                         *
403                         *       NEXTLINE IS INITIALIZED TO IMAGE THE FIRST "LOFFSET" LINES
404                         *       AT LOW Y AND A BLANK LINE AT HIGH Y
405                         *
406
407   0024249A 283C00000494 NXTLINIT MOVE.L #LL,D4                  LENGTH OF LINE
408   002424A0 4285              CLR.L    D5                        NO INCREMENT FOR BLANK LINE
409   002424A2 7C00              MOVE.L   #NWRITES-2,D6             LINE REPEAT COUNTER
410   002424A4 7E09              MOVE.L   #LOFFSET-1,D7             COUNT FOR FIRST SET OF LINES
411   002424A6 45FA007E          LEA      NLSAVE(PC),A2             ADDRESS OF REGISTER SAVE AREA
412   002424AA 47FA009E          LEA      YTABLE(PC),A3             ADDRESS OF Y DEFLECTION TABLE
413   002424AE 223C00000100      MOVE.L   #$0100,D1                 SET CRT CONTROL FOR FIRST LINE
414   002424B4 203C00000300      MOVE.L   #$0300,D0                 SET CRT CONTROL FOR SECOND LINE
```

```
415  002424BA  121B              MOVE.B    (A3)+,D1           ADD IN Y DEFLECTION FOR 1ST LINE
416  002424BC  101B              MOVE.B    (A3)+,D0           ADD IN Y DEFLECTION FOR 2ND LINE
417  002424BE  287823AC          MOVEA.L   IMAGEMEM,A4        ADDR OF LINE FOR LOW Y (1ST LINE)
418  002424C2  4BF90050B9F8      LEA       BLANKLIN,A5        ADDRESS OF LINE FOR HIGH Y
419  002424C8  204D              MOVE.L    A5,A0              SECOND LINE TO IMAGE
420  002424CA  4DFA003A          LEA       NLMID(PC),A6       ADDRESS OF ROUTINE FOR MIDDLE
421  002424CE  48D27CF0          MOVEM.L   D4-D7/A2-A6,(A2)   SAVE NEXTLINE REGISTERS
422  002424D2  4E75              RTS
423
424  002424D4  48E70F3E  NEXTLINE MOVEM.L  D4-D7/A2-A6,-(SP)  SAVE REGISTERS
425  002424D8  4CFA7CF0004A      MOVEM.L   NLSAVE(PC),D4-D7/A2-A6  GET REGISTERS FOR THIS ROUTINE
426  002424DE  204D              MOVE.L    A5,A0              SET ADDRESS FOR NEXT LINE
427  002424E0  51CE0016          DBF       D6,NEXTEXIT        COUNT DOWN LINE REPEAT COUNT
428  002424E4  51CF0004          DBF       D7,NEXTREP         DONE THIS PART OF IMAGE?
429  002424E8  4ED6              JMP       (A6)               YES - SET UP NEXT PART
430
431  002424EA  D8C4      NEXTREP  ADDA.W   D4,A4              NEXT LINE FOR LOW Y
432  002424EC  DAC5              ADDA.W    D5,A5              NEXT LINE FOR HIGH Y
433  002424EE  204C              MOVE.L    A4,A0              NEXT LINE IS LOW Y
434  002424F0  3C3C0001          MOVE.W    #NWRITES-1,D6      RESET REPEAT COUNT
435  002424F4  47FA0054          LEA       YTABLE(PC),A3      RESET Y DEFLECTION TABLE ADDRESS
436  002424F8  1013      NEXTEXIT MOVE.B   (A3),D0            NEXT Y
437  002424FA  121B              MOVE.B    (A3)+,D1
438  002424FC  48D27CF0          MOVEM.L   D4-D7/A2-A6,(A2)   SAVE NEXTLINE REGISTERS
439  00242500  4CDF7CF0          MOVEM.L   (SP)+,D4-D7/A2-A6  RESTORE REGISTERS
440  00242504  4E75              RTS
441
442                    *
443                    *         ENTERED AFTER "LOFFSET" LINES HAVE BEEN IMAGED AT LOW Y
444                    *         AND NOTHING IMAGED AT HIGH Y.  BY NOW, IMAGE LINE 1 HAS
445                    *         MOVED UNDER THE HIGH Y POSITION.
446                    *
447                    *         FOR MIDDLE OF IMAGE, WRITE NEXT IMAGE LINE ON LOW Y
448                    *         AND NEXT + "LOFFSET" IMAGE LINE ON HIGH Y
449                    *
450
451  00242506  3A04      NLMID    MOVE.W   D4,D5              SET INCREMENT ON HIGH Y
452  00242508  2A7823AC          MOVEA.L   IMAGEMEM,A5        IMAGE LINE 1 ON HIGH Y
453  0024250C  9BFC00000494      SUBA.L    #LL,A5
454  00242512  3E3C071B          MOVE.W    #PL-LOFFSET-1,D7   IMAGE REMAINDER OF LINES
455  00242516  4DFA0004          LEA       NLEND(PC),A6       SET-UP FOR LAST "LOFFSET" LINES
456  0024251A  60CE              BRA       NEXTREP
457
458                    *
459                    *         ENTERED AFTER "PL" LINES HAVE BEEN IMAGED AT LOW Y
460                    *         AND "PL-LOFFSET" LINES IMAGED AT HIGH Y.  NOW, IMAGE
461                    *         LAST "LOFFSET" LINES AT THE HIGH Y POSITION.
462                    *
463                    *         FOR END OF IMAGE, WRITE NEXT IMAGE LINE ON HIGH Y
464                    *         AND BLANK IMAGE LINE ON LOW Y
465                    *
466
467  0024251C  49F90050B9F8 NLEND LEA      BLANKLIN,A4        IMAGE BLANK LINE ON LOW Y
468  00242522  4244              CLR.W     D4                 NO INCREMENT FOR LOW Y
469  00242524  60C4              BRA       NEXTREP
470
471  00242526  00000024  NLSAVE   DS.L     9                  SPACE TO SAVE 9 REGISTERS
472  0024254A  10        YTABLE   DC.B     $10                LOW Y
473  0024254B  F0                DC.B      $F0                HIGH Y
474
475                    *
476                    * INITIALIZE CRT INTERFACE
477                    *
478  0024254C  48E7FFFE  IMG_INIT MOVEM.L  D0-D7/A0-A6,-(SP)  SAVE REGISTERS
479  00242550  61000142          BSR       TMR_INI            INITIALIZE TIMER CONTROLLER
480  00242554  61000048          BSR       LUT_INI            INITIALIZE LOOK-UP TABLE
481  00242558  61000066          BSR       DMA_INI            INITIALIZE DMA CONTROLLER
482                    *         BSR       CALCRT             CALIBRATE CRT
483  0024255C  61000032          BSR       BLANKCRT           BLANK CRT
484  00242560  207823AC          MOVEA.L   IMAGEMEM,A0        SET LAST 2 PIXELS OF EACH
485  00242564  2248              MOVEA.L   A0,A1
486  00242566  D3FC0020B9F8      ADDA.L    #(LL*PL),A1        LINE TO TURN OFF CRT BEAM
487  0024256C  7000              MOVE.L    #PXLOFF,D0
488  0024256E  D0FC0492  IMG_IN1 ADDA.W    #(LL-2),A0
489  00242572  10C0              MOVE.B    D0,(A0)+
490  00242574  10C0              MOVE.B    D0,(A0)+
491  00242576  B3C8              CMPA.L    A0,A1
492  00242578  62F4              BHI       IMG_IN1
493  0024257A  41F90050B9F8      LEA       BLANKLIN,A0        INITIALIZE BLANK LINE
494  00242580  323C0125          MOVE.W    #LL/4,D1           LONGWORDS ON EACH LINE
495  00242584  20C0      IMG_IN2 MOVE.L    D0,(A0)+
496  00242586  51C9FFFC          DBF       D1,IMG_IN2
497  0024258A  4CDF7FFF          MOVEM.L   (SP)+,D0-D7/A0-A6  RESTORE REGISTERS
498  0024258E  4E75              RTS
499                    *
500                    *
501                    * CALIBRATE CRT
502                    *
503                    *
504                    *CALCRT    LEA       CRTY_C,A3
505                    *         MOVE.W    #$0000,ZSEL        TURN ON CRT BEAM
506                    *         MOVE.W    #$007F,(A3)        SET FOR INTENSITY DATA
507                    *         MOVE.W    #$037F,(A3)
508                    *         MOVE.W    #$017F,(A3)
509                    *         MOVE.W    #10,D0             WAIT 20 USEC
510                    *         DBF       D0,*
511                    *         MOVE.W    #$897F,(A3)        RESET CRT
512                    *         MOVE.W    #$3B00,D1          CALIBRATE BRIGHTNESS
```

```
513                         *          MOVE.W    #$3900,D2
514                         *          MOVE.W    #20000,D0         WAIT 100 MSEC
515                         *ALCRT1    MOVE.B    D0,D1
516                         *          MOVE.B    D0,D2
517                         *          MOVE.W    D1,(A3)
518                         *          MOVE.W    D2,(A3)
519                         *          DBF       D0,CALCRT1
520                         *          EOR.W     #$8000,D1         RESET CRT
521                         *          EOR.W     #$8000,D2
522                         *          MOVE.W    #10000,D0         WAIT 50 MSEC
523                         *ALCRT2    MOVE.B    D0,D1             USE LOW BYTE FOR Y DEFLECTION
524                         *          MOVE.B    D0,D2
525                         *          MOVE.W    D1,(A3)
526                         *          MOVE.W    D2,(A3)
527                         *          DBF       D0,CALCRT2
528                         *          EOR.W     #$9000,D1         CALIBRATE CONTRAST
529                         *          EOR.W     #$9000,D2
530                         *          MOVE.W    #20000,D0         WAIT 100 MSEC
531                         *ALCRT3    MOVE.B    D0,D1             USE LOW BYTE FOR Y DEFLECTION
532                         *          MOVE.B    D0,D2
533                         *          MOVE.W    D1,(A3)
534                         *          MOVE.W    D2,(A3)
535                         *          DBF       D0,CALCRT3
536                         *          MOVE.W    #$027F,(A3)
537                         *          MOVE.W    #$007F,(A3)       END OF CALIBRATION
538                         *          RTS
539
540
541                         *
542                         * BLANK CRT
543                         *
544   00242590 33FCFFFF00FF  BLANKCRT  MOVE.W    #BEAMOFF,ZSEL     DATA TO BLANK CRT
               0908
545   00242598 36BC007F                MOVE.W    #$007F,(A3)
546   0024259C 4E75                    RTS
547
548
549                         *
550                         *
551                         * INITIALIZE LOOK-UP TABLE (LUT)
552                         *
553   0024259E 47F900FF0904  LUT_INI   LEA       CRTY_C,A3         ADDRESS OF CONTROL AND Y
554   002425A4 36BC007F                MOVE.W    #$007F,(A3)       DISABLE VIDEO
555   002425A8 43F900FF0A00            LEA       LUTBASE,A1        ADDRESS OF EXTERNAL LUT RAM
556   002425AE 41F90000A000            LEA       ZLUT,A0           ADDRESS OF LUT LOADED FROM DISK
557   002425B4 303C00FF                MOVE.W    #256-1,D0         COPY 256 WORDS
558   002425B8 32D8          LUT_IN1   MOVE.W    (A0)+,(A1)+
559   002425BA 51C8FFFC                DBF       D0,LUT_IN1
560   002425BE 4E75                    RTS
561                         *
562                         *
563                         * INITIALIZE DMA CONTROLLER
564                         *
565   002425C0 4DF900FF0800  DMA_INI   LEA       DMABASE,A6        POINT TO DMA CONTROLLER
566   002425C6 1D7C00100007            MOVE.B    #$10,CHAN0+DMACCR(A6)  CLEAR OUT ANY ERRORS
567   002425CC 1D7C00100047            MOVE.B    #$10,CHAN1+DMACCR(A6)
568   002425D2 08160003      DMAIN1    BTST.B    #3,CHAN0+DMACSR(A6)    DONE?
569   002425D6 66FA                    BNE       DMAIN1            IF NE NO
570   002425D8 082E00030040  DMAIN2    BTST.B    #3,CHAN1+DMACSR(A6)    DONE?
571   002425DE 66F8                    BNE       DMAIN2            IF NE NO
572   002425E0 61000098                BSR       DMACLR            CLEAR OUT LAST COMMAND
573   002425E4 1D7C000000FF            MOVE.B    #$00,DMAGCR(A6)   INITIALIZE DMA CONTROLLER
574   002425EA 1D7C00440025            MOVE.B    #$44,CHAN0+DMANIN(A6)  INITIALIZE INTERRUPT VECTORS
575   002425F0 1D7C00440027            MOVE.B    #$44,CHAN0+DMAEIN(A6)
576   002425F6 1D7C00450065            MOVE.B    #$45,CHAN1+DMANIN(A6)
577   002425FC 1D7C00450067            MOVE.B    #$45,CHAN1+DMAEIN(A6)
578   00242602 41FAFE6C                LEA       INTSERV(PC),A0
579   00242606 21C80110                MOVE.L    A0,$44*4          SET INTERRUPT VECTOR
580   0024260A 41FA006C                LEA       FGSERV(PC),A0
581   0024260E 21C80114                MOVE.L    A0,$45*4
582                         *
583   00242612 1D7C00A00004            MOVE.B    #$A0,CHAN0+DMADCR(A6)
584   00242618 1D7C00A00044            MOVE.B    #$A0,CHAN1+DMADCR(A6)
585   0024261E 1D7C00020005            MOVE.B    #$02,CHAN0+DMAOCR(A6)
586   00242624 1D7C00320045            MOVE.B    #$32,CHAN1+DMAOCR(A6)
587   0024262A 1D7C00040006            MOVE.B    #$04,CHAN0+DMASCR(A6)
588   00242630 1D7C00040046            MOVE.B    #$04,CHAN1+DMASCR(A6)
589   00242636 1D7C0000002D            MOVE.B    #$00,CHAN0+DMACFR(A6)
590   0024263C 1D7C0001006D            MOVE.B    #$01,CHAN1+DMACPR(A6)
591   00242642 2D7C00000000            MOVE.L    #$000000,CHAN0+DMADAR(A6)  DEVICE ADDRESS NOT USED
               0014
592   0024264A 2D7C00000000            MOVE.L    #$000000,CHAN1+DMADAR(A6)
               0054
593   00242652 1D7C00060029            MOVE.B    #$06,CHAN0+DMAMFC(A6)  ALL DATA IN SUPER MEMORY
594   00242658 1D7C00060031            MOVE.B    #$06,CHAN0+DMADFC(A6)
595   0024265E 1D7C00060039            MOVE.B    #$06,CHAN0+DMABFC(A6)
596   00242664 1D7C00060069            MOVE.B    #$06,CHAN1+DMAMFC(A6)
597   0024266A 1D7C00060071            MOVE.B    #$06,CHAN1+DMADFC(A6)
598   00242670 1D7C00060079            MOVE.B    #$06,CHAN1+DMABFC(A6)
599   00242676 4E75                    RTS
600
601                         *
602                         * FRAME GRABBER INTERRUPT SERVICE
603                         *
604   00242678 60FE          FGSERV    BRA       *
605
606                         *
607                         * CLEAR OUT PREVIOUS DMA COMMAND AND ERROR
```

```
608                              *
609   0024267A 1D7C00F20040 DMACLR   MOVE.B  #$F2,CHAN1+DMACSR(A6)
610   00242680 082E00070040          BTST.B  #7,CHAN1+DMACSR(A6)    DONE?
611   00242686 66F2                  BNE     DMACLR                 IF NE NO
612   00242688 1CBC00F2     DMACLR1  MOVE.B  #$F2,CHAN0+DMACSR(A6)
613   0024268C 08160007              BTST.B  #7,CHAN0+DMACSR(A6)    DONE?
614   00242690 66F6                  BNE     DMACLR1                IF NE NO
615   00242692 4E75                  RTS
616                              *
617                              *
618                              * INITIALIZE TIMER CONTROLLER
619                              *
620                              *     RESOLUTION IS 0.2 MICROSECONDS PER COUNT
621                              *
622            00000011     PXLOW    EQU     17                     3.4 USEC PIXEL CLOCK LOW
623            00000005     PXHIGH   EQU     5                      1.0 USEC PIXEL CLOCK HIGH
624            00000602     HRETRACE EQU     1538                   307.6 USEC HORIZONTAL RETRACE
625
626   00242694 4BF900FF0902 TMR_INI  LEA     TMRCTL,A5              POINT TO TIMER CONTROL REGISTER
627   0024269A 49F900FF0900          LEA     TMRDAT,A4              POINT TO TIMER DATA REGISTER
628   002426A0 47F900FF0904          LEA     CRTY_C,A3              POINT TO CRT CONTROL REGISTER
629   002426A6 36BC007F              MOVE.W  #$007F,(A3)            TURN OFF VIDEO
630   002426AA 3ABCFFFF              MOVE.W  #$FFFF,(A5)            RESET TIMER CONTROLLER
631   002426AE 3ABCFF5F              MOVE.W  #$FF5F,(A5)            LOAD COUNTERS TO CLEAR TC
632   002426B2 3ABCFFEF              MOVE.W  #$FFEF,(A5)            SET TO 16-BIT DATA MODE
633   002426B6 3ABCFF17              MOVE.W  #$FF17,(A5)            SELECT MMR REGISTER
634   002426BA 38BCF000              MOVE.W  #$F000,(A4)            SET TO 16-BIT DATA, BCD SCALE
635   002426BE 3ABCFF05              MOVE.W  #$FF05,(A5)            SELECT COUNTER 5 MODE REGISTER
636   002426C2 38BC8B62              MOVE.W  #$8B62,(A4)            MODE K,5MHZ SRC,TC TOG,GATE 5
637   002426C6 3ABCFFED              MOVE.W  #$FFED,(A5)            SET TC HIGH
638   002426CA 3ABCFF0D              MOVE.W  #$FF0D,(A5)            SELECT COUNTER 5 LOAD REGISTER
639   002426CE 38BC0011              MOVE.W  #PXLOW,(A4)            PIXEL CLOCK LOW
640   002426D2 3ABCFF15              MOVE.W  #$FF15,(A5)            SELECT COUNTER 5 HOLD REGISTER
641   002426D6 38BC0005              MOVE.W  #PXHIGH,(A4)           PIXEL CLOCK HIGH
642   002426DA 3ABCFF04              MOVE.W  #$FF04,(A5)            SELECT COUNTER 4 MODE REGISTER
643   002426DE 38BC0B62              MOVE.W  #$0B62,(A4)            MODE J,5MHZ SRC,TC TOG,NO GATE
644   002426E2 3ABCFFE4              MOVE.W  #$FFE4,(A5)            SET COUNTER 4 TC LOW
645   002426E6 3ABCFF14              MOVE.W  #$FF14,(A5)            SELECT COUNTER 4 HOLD REGISTER
646   002426EA 38BC64B8              MOVE.W  #LL*(PXLOW+PXHIGH),(A4) HIGH FOR "LL" PIXELS ON LINE
647   002426EE 3ABCFF0C              MOVE.W  #$FF0C,(A5)            SELECT COUNTER 4 LOAD REGISTER
648   002426F2 38BC0602              MOVE.W  #HRETRACE,(A4)         HORIZONTAL RETRACE TIME
649   002426F6 3ABCFF68              MOVE.W  #$FF68,(A5)            LOAD AND ARM CNTR 4 (SWEEPGATE)
650   002426FA 4E75                  RTS
651
652                              *
653                              * SUBROUTINES
654                              *
655
656   002426FC 2C3C0000FFFF SECOND   MOVE.L  #$FFFF,D6              0.1 SECOND DELAY
657   00242702 51CEFFFE     S1       DBF     D6,S1
658   00242706 51CFFFF4              DBF     D7,SECOND
659   0024270A 4E75                  RTS
660
661   0024270C 122A0001     READGO   MOVE.B  1(A2),D1               READ INPUT REGISTER
662   00242710 08010000              BTST    #0,D1                  TEST FOR GO BUTTON PUSHED
663   00242714 66F6                  BNE     READGO                 GO BUTTON NOT PUSHED
664   00242716 2C3C00008000          MOVE.L  #$8000,D6              50MS DELAY FOR SWITCH DEBOUNCING
665   0024271C 51CEFFFE     READ1    DBF     D6,READ1
666   00242720 122A0001              MOVE.B  1(A2),D1               READ INPUT REGISTER AGAIN
667   00242724 08010000              BTST    #0,D1                  TEST IF GO BUTTON STILL PUSHED
668   00242728 66E2                  BNE     READGO                 GO BUTTON NOT STILL PUSHED
669   0024272A 2C3C00008000          MOVE.L  #$8000,D6              50MS DELAY FOR SWITCH DEBOUNCING
670   00242730 51CEFFFE     READ2    DBF     D6,READ2
671   00242734 122A0001              MOVE.B  1(A2),D1               READ INPUT REGISTER A THIRD TIME
672   00242738 08010000              BTST    #0,D1                  TEST IF GO BUTTON STILL PUSHED
673   0024273C 66CE                  BNE     READGO                 GO BUTTON NOT STILL PUSHED
674   0024273E 4E75                  RTS
675
676   00242740 122A0001     HOMESENS MOVE.B  1(A2),D1               READ PORT 1
677   00242744 4E75                  RTS
678
679   00242746 122A0001     HOMESEE  MOVE.B  1(A2),D1               READ INPUT REGISTER
680   0024274A 08010001              BTST    #1,D1                  TEST FOR HOME SENSOR
681   0024274E 67F6                  BEQ     HOMESEE
682                              *            MOVE.L  #1,D6
683                              *HOME1       MOVE.L  #$FFFF,D7
684                              *HOMELOOP    DBF     D7,HOMELOOP
685                              *            DBF     D6,HOME1
686   00242750 4E75                  RTS
687
688   00242752 14BC0009     CLRPORT  MOVE.B  #$09,(A2)              SET DDR PORTS 0 & 3 ARE ALWAYS OUT
689                              *                                  PORT1 IS ALWAYS IN & PORT 2 IS BIDIR
690   00242756 157C00000001          MOVE.B  #$00,1(A2)             CLEAR OUTPUTS ON PORT 0
691   0024275C 157C00010003          MOVE.B  #$01,3(A2)             CLEAR OUTPUTS ON PORT 2
692   00242762 157C00000004          MOVE.B  #$00,4(A2)             CLEAR OUTPUTS ON PORT 3
693   00242768 4240                  CLR     D0                     CLEAR PORT 0 DATA
694   0024276A 4241                  CLR     D1                     CLEAR PORT 1 DATA
695   0024276C 4242                  CLR     D2                     CLEAR PORT 2 DATA
696   0024276E 4243                  CLR     D3                     CLEAR PORT 3 DATA
697   00242770 4E75                  RTS
698                              * NOTE: NO CONTROL IS DONE USING PORT 0, BIT #2,5 AND 6
699   00242772 00000020     DRYERON  OR.B    #$20,D0                PREPARE CONTROL REGISTER
700   00242776 1480                  MOVE.B  D0,(A2)                TURN DRYER ON
701   00242778 4E75                  RTS
702
703   0024277A 020000DF     DRYEROFF AND.B   #$DF,D0                PREPARE CONTROL REGISTER
704   0024277E 1480                  MOVE.B  D0,(A2)                TURN DRYER OFF
705   00242780 4E75                  RTS
```

```
706
707  00242782 1012          TRANSON   MOVE.B  (A2),D0
708  00242784 00000004                OR.B    #$04,D0      PREPARE CONTROL REGISTER
709  00242788 1480                    MOVE.B  D0,(A2)      TURN TRANSPORT ON
710  0024278A 4E75                    RTS
711
712  0024278C 020000FB     TRANSOFF  AND.B   #$FB,D0      PREPARE CONTROL REGISTER
713  00242790 1480                    MOVE.B  D0,(A2)      TURN TRANSPORT OFF
714  00242792 4E75                    RTS
715
716  00242794 00030010     TRANSREV  OR.B    #$10,D3      PREPARE CONTROL REGISTER
717  00242798 15430003                MOVE.B  D3,3(A2)     TURN TRANSPORT ON
718  0024279C 4E75                    RTS
719
720  0024279E 020300EF     TRANSFOR  AND.B   #$EF,D3      PREPARE CONTROL REGISTER
721  002427A2 15430003                MOVE.B  D3,3(A2)     TURN TRANSPORT OFF
722  002427A6 4E75                    RTS
723
724
725  002427A8 00000001     CHARGON   OR.B    #$01,D0      PREPARE CONTROL REGISTER
726  002427AC 1480                    MOVE.B  D0,(A2)      TURN SCOROTRON ON
727  002427AE 4E75                    RTS
728
729  002427B0 1012         CHARGOFF  MOVE.B  (A2),D0      READ PORT 0
730  002427B2 020000FE               AND.B   #$FE,D0      PREPARE CONTROL REGISTER
731  002427B6 1480                   MOVE.B  D0,(A2)      TURN SCOROTRON OFF
732  002427B8 4E75                   RTS
733
734  002427BA 00030008     RDYLTON   OR.B    #$08,D3
735  002427BE 15430003               MOVE.B  D3,3(A2)     WRITE PORT 3
736  002427C2 4E75                   RTS
737
738  002427C4 020300F7     RDYLTOFF  AND.B   #$F7,D3
739  002427C8 15430003               MOVE.B  D3,3(A2)     WRITE PORT 3
740  002427CC 4E75                   RTS
741
742  002427CE 00000010     TONERON   OR.B    #$10,D0      PREPARE CONTROL REGISTER
743  002427D2 1480                   MOVE.B  D0,(A2)      TURN TONER PUMP ON
744  002427D4 4E75                   RTS
745
746  002427D6 020000EF     TONEROFF  AND.B   #$EF,D0      PREPARE CONTROL REGISTER
747  002427DA 1480                   MOVE.B  D0,(A2)      TURN TONER PUMP OFF
748  002427DC 4E75                   RTS
749
750  002427DE 1012         DEVELOFF  MOVE.B  (A2),D0
751  002427E0 020000FD               AND.B   #$FD,D0      PREPARE CONTROL REGISTER
752  002427E4 1480                   MOVE.B  D0,(A2)      TURN DEVELOPMENT ELECTRODE OFF
753  002427E6 4E75                   RTS
754
755  002427E8 00000040     VACUMON   OR.B    #$40,D0      PREPARE CONTROL REGISTER (PORT 0,
756                                  *                      BIT 6)
757  002427EC 1480                   MOVE.B  D0,(A2)      TURN VACUUM ON
758  002427EE 7C14                   MOVE.L  #20,D6       1.5 SEC DELAY
759  002427F0 2E3C0000FFFF V1        MOVE.L  #$FFFF,D7    100 MILLISEC DELAY
760  002427F6 51CFFFFE     VACDEL    DBF     D7,VACDEL
761  002427FA 51CEFFF4               DBF     D6,V1
762  002427FE 4E75                   RTS
763
764  00242800 020000BF     VACUMOFF  AND.B   #$BF,D0      PREPARE CONTROL REGISTER
765  00242804 1480                   MOVE.B  D0,(A2)      TURN VACUUM OFF
766  00242806 4E75                   RTS
767
768  00242808 00000008     FSHTRON   OR.B    #$08,D0      PREPARE CONTROL REGISTER (PORT 0,
769                                  *                      BITS 3 AND 7)
770  0024280C 1480                   MOVE.B  D0,(A2)      TURN FUSER HEAT ON
771  0024280E 4E75                   RTS
772
773  00242810 020000F7     FSHTROFF  AND.B   #$F7,D0      PREPARE CONTROL REGISTER
774  00242814 1480                   MOVE.B  D0,(A2)      TURN FUSING HEAT OFF
775  00242816 4E75                   RTS
776
777  00242818 00000080     FSPEDON   OR.B    #$80,D0      PREPARE CONTROL REGISTER (PORT 0,
778                                  *                      BITS 3 AND 7)
779  0024281C 1480                   MOVE.B  D0,(A2)      TURN FUSER SPEED ON
780  0024281E 4E75                   RTS
781
782  00242820 0200007F     FSPEDOFF  AND.B   #$7F,D0      PREPARE CONTROL REGISTER
783  00242824 1480                   MOVE.B  D0,(A2)      TURN FUSING SPEED OFF
784  00242826 4E75                   RTS
785
786  00242828 00030002     AIRPULSE  OR.B    #$02,D3      PREPARE CONTROL REGISTER
787  0024282C 15430003               MOVE.B  D3,3(A2)     TURN AIR PULSE ON
788  00242830 7E27                   MOVE.L  #39,D7       4.0 SECOND PULSE LENGTH
789  00242832 6100FEC8               BSR     SECOND
790  00242836 020300FD               AND.B   #$FD,D3      PREPARE CONTROL REGISTER
791  0024283A 15430003               MOVE.B  D3,3(A2)     TURN AIR PULSE OFF
792  0024283E 4E75                   RTS
793
794  00242840 00030004     BEEP      OR.B    #$04,D3      PREP CONTROL REGISTER
795  00242844 15430003               MOVE.B  D3,3(A2)     TURN ON BEEPER
796  00242848 7E04                   MOVE.L  #4,D7        500 MILLISEC BEEP
797  0024284A 6100FEB0               BSR     SECOND
798  0024284E 020300FB               AND.B   #$FB,D3      PREP CONTROL REGISTER
799  00242852 15430003               MOVE.B  D3,3(A2)     TURN OFF BEEPER
800  00242856 4E75                   RTS
801
802  00242858 7A04         BEEP5     MOVE.L  #4,D5        5 BEEPS
803  0024285A 7E02         MBEEP     MOVE.L  #2,D7        300 MILLISEC OFF
804  0024285C 6100FE9E               BSR     SECOND
```

```
805  00242860 610E                       BSR       BEEP
806  00242862 51CDFFF6            DBF       D5,MBEEP
807  00242866 4E75                        RTS
808  00242868 162A0003   CAMDOWN  MOVE.B    3(A2),D3        PREPARE CONTROL REGISTER
809  0024286C 00030001            OR.B      #$01,D3         TURN FUSER CAM DOWN
810  00242870 15430003            MOVE.B    D3,3(A2)
811  00242874 7E06                MOVE.L    #06,D7          700 MSEC FOR MOTOR TO TURN
812  00242876 6100FE84            BSR       SECOND
813  0024287A 020300FE            AND.B     #$FE,D3         PREPARE CONTROL REGISTER
814  0024287E 15430003            MOVE.B    D3,3(A2)        TURN FUSER CAM MOTOR OFF
815  00242882 4E75                RTS
816
817  00242884 162A0003   CAMUP    MOVE.B    3(A2),D3
818  00242888 00030001            OR.B      #$01,D3
819  0024288C 15430003            MOVE.B    D3,3(A2)
820  00242890 122A0001   CAMLOOP  MOVE.B    1(A2),D1        READ INPUT PORT 1
821  00242894 08010004            BTST      #$04,D1         LOOK FOR HIGH SIGNAL
822  00242898 66F6                BNE       CAMLOOP         KEEP LOOKING FOR SENSOR
823  0024289A 020300FE            AND.B     #$FE,D3
824  0024289E 15430003            MOVE.B    D3,3(A2)
825  002428A2 4E75                RTS
826
827  002428A4 122A0001   FILMSENS MOVE.B    1(A2),D1        READ FILM PRESENCE AT SCOROTRON SENSOR
828  002428A8 4E75                RTS
829
830  002428AA 020200FE   FEEDFILM AND.B     #$FE,D2         SER. COMMUNICATION LINE IS PORT
831          *                                              2, BIT 0.
832  002428AE 157C000DFFFF        MOVE.B    #$0D,-1(A2)     RECONFIG DDR; SER COMM LINE OUTPUT
833  002428B4 15420002            MOVE.B    D2,2(A2)        FILM FEED SIGNAL
834  002428B8 2E3C00003F88        MOVE.L    #$3F88,D7       20 MSEC PULSE LENGTH
835  002428BE 51CFFFFE   FFLP     DBF       D7,FFLP
836  002428C2 00020001            OR.B      #$01,D2         TURN OFF SIGNAL
837  002428C6 15420002            MOVE.B    D2,2(A2)
838  002428CA 157C0009FFFF        MOVE.B    #$09,-1(A2)     RECONFIG DDR; SER COMM LINE IS INPUT
839  002428D0 7E13       HOLDLOOP MOVE.L    #19,D7          WAIT 2. SEC BEFORE LOOKING FOR
840  002428D2 6100FE28            BSR       SECOND          HANDSHAKE
841  002428D6 4287                CLR.L     D7              PREP D7 FOR HANDSHAKE LOOP COUNTER
842  002428D8 142A0002   HANSHK   MOVE.B    2(A2),D2        READ PORT 2
843  002428DC 5287                ADDQ.L    #1,D7
844  002428DE 0C87000A0000        CMPI.L    #$A0000,D7      APPROX 6 SECOND WAIT IN LOOP
845  002428E4 67000028            BEQ       ERRFF
846  002428E8 08020000            BTST      #$00,D2
847  002428EC 66EA                BNE       HANSHK          LOOP IF HANDSHAKE SIGNAL IS STILL HIGH
848  002428EE 2E3C00004000        MOVE.L    #$4000,D7       CHECK TO BE SURE NOT STILL LOW AFTER
849  002428F4 51CFFFFE   CHECK    DBF       D7,CHECK        10 MSEC
850  002428F8 142A0002            MOVE.B    2(A2),D2
851  002428FC 08020000            BTST      #$00,D2
852  00242900 67CE                BEQ       HOLDLOOP        KEEP LOOKING FOR HANDSHAKE IF STILL  W
853  00242902 3E3C0015            MOVE.W    #$15,D7
854  00242906 6100FDF4            BSR       SECOND
855  0024290A 6000001C            BRA       NORM
856  0024290E 6100FF48   ERRFF    BSR       BEEP5           FIVE BEEPS
857  00242912 48FAFA75            LEA       FFE1(PC),A5     FILM FEED ERROR MESSAGE
858  00242916 4DFAFA93            LEA       FFE2(PC),A6
859  0024291A 4E4F                TRAP      #15
860  0024291C 0006                DC.W      OUTPUT
861  0024291E 11FC000023AB        MOVE.B    #0,PASS         CLEAR PASS COUNTER LOCATION
862  00242924 6000F71A            BRA       RESTART
863  00242928 4E75       NORM     RTS
864
865  0024292A 08050000   COUNTER  BTST      #0,D5           LOOKING FOR BLACK OR WHITE?
866  0024292E 66000028            BNE       WHTCNT1
867  00242932 122A0001            MOVE.B    1(A2),D1        READ PORT 1
868  00242936 08010002            BTST      #2,D1           LOOK FOR BLACK(=1)
869  0024293A 67000048            BEQ       TEST            TRY AGAIN IF NOT BLACK
870  0024293E 02020001            AND.B     #$01,D2         FLAG THAT ONE BLACK HAS BEEN SEEN
871  00242942 08020000            BTST      #0,D2           LOOK TO SEE IF 1 BLACK ALREADY SEEN
872  00242946 67000036            BEQ       ADDONE          COUNT 1 BLACK IF NONE PREVIOUSLY
873  0024294A 02020000            AND.B     #$00,D2         REMOVE FLAG WHEN 1 BLACK ALREADY SEEN
874  0024294E 00050001            OR.B      #$01,D5         FLAG THAT 2 BLACKS SEEN--READY TO
875          *                                              COUNT WHITES
876  00242952 51CFFFD6            DBF       D7,COUNTER      SUBTRACT 1 FROM THE NUMBER OF
877          *                                              TRANSITIONS EXPECTED
878  00242956 4E75                RTS
879
880  00242958 122A0001   WHTCNT1  MOVE.B    1(A2),D1        READ PORT 1
881  0024295C 08010002            BTST      #2,D1           LOOK FOR WHITE(=0)
882  00242960 66000022            BNE       TEST
883  00242964 02020001            AND.B     #$01,D2         IF WHITE,SET FLAG THAT 1 WHITE
884          *                                              HAS BEEN SEEN
885  00242968 08020000            BTST      #0,D2           LOOK TO SEE IF THIS IS THE FIRST
886          *                                              OR SECOND WHITE
887  0024296C 67000010            BEQ       ADDONE          ADD 1 TO D2 IF THIS IS THE FIRST
888  00242970 02020000            AND.B     #$00,D2         REMOVE FLAG IF THIS IS THE SECOND
889  00242974 02050000            AND.B     #$00,D5         ZERO FLAG TO LOOK FOR BLACK
890  00242978 51CFFFB0            DBF       D7,COUNTER      SUBTACT 1 FROM THE # OF EXPECTED
891          *                                              TRANSITIONS
892  0024297C 4E75                RTS
893
894  0024297E 00020001   ADDONE   OR.B      #$01,D2         ADD 1 TO FLAG THAT 1 OF A NEW COLOR
895          *                                              HAS BEEN SEEN
896  00242982 60A6                BRA       COUNTER
897  00242984 08020000   TEST     BTST      #0,D2           TEST TO SEE IF 1 OF THE DESIRED
898          *                                              COLOR HAS ALREADY BEEN SEEN
899  00242988 67A0                BEQ       COUNTER         IF IT ISN'T, REPEAT
900  0024298A 02020000            AND.B     #$00,D2         IF IT IS, REMOVE IT
901  0024298E 609A                BRA       COUNTER
902
903  00242990 41FAF66E   COPYCODE LEA       START(PC),A0
```

```
904   00242994 43FAFFFA              LEA     COPYCODE(PC),A1    RELOCATE PROGRAM TO $2000
905   00242998 247C00002000          MOVE.L  #$2000,A2
906   0024299E 24D8        COPYLOOP  MOVE.L  (A0)+,(A2)+
907   002429A0 B3C8                  CMPA.L  A0,A1
908   002429A2 62FA                  BHI     COPYLOOP
909   002429A4 700F                  MOVE.L  #15,D0             EXIT TO DOS
910   002429A6 4E41                  TRAP    #1
911
912            00242990              END     COPYCODE
```

****** TOTAL ERRORS      0--
****** TOTAL WARNINGS    0--

SYMBOL TABLE LISTING

| SYMBOL NAME | SECT | VALUE | SYMBOL NAME | SECT | VALUE |
|---|---|---|---|---|---|
| ADDONE | | 0024297E | HOMESENS | | 00242740 |
| AIRPULSE | | 00242828 | HRETRACE | | 00000602 |
| BCS | | 00000028 | IMAG1BAS | | 00300000 |
| BEAMOFF | | FFFFFFFF | IMAG2BAS | | 00580000 |
| BEEP | | 00242840 | IMAGBASE | | 002423AC |
| BEEP5 | | 00242858 | IMAGE | | 002423B0 |
| BLANKCRT | | 00242590 | IMAGE1 | | 0024240E |
| BLANKLIN | | 0050B9F8 | IMAGE2 | | 00242424 |
| BM | | 00000028 | IMAGE3 | | 00242438 |
| CAMDOWN | | 00242868 | IMAGEMEM | | 000023AC |
| CAMLOOP | | 00242890 | IMG_IN1 | | 0024256E |
| CAMUP | | 00242884 | IMG_IN2 | | 00242584 |
| CHAN0 | | 00000000 | IMG_INIT | | 0024254C |
| CHAN1 | | 00000040 | INTSERV | | 00242470 |
| CHARGOFF | | 002427B0 | INTSVCA | | 00242488 |
| CHARGON | | 002427A8 | LL | | 00000494 |
| CHECK | | 002428F4 | LM | | 00000047 |
| CLRPORT | | 00242752 | LOFFSET | | 0000000A |
| CONG | | 0024236C | LUTBASE | | 00FF0A00 |
| CONG2 | | 00242389 | LUT_IN1 | | 002425B8 |
| CONTINU | | 0024244A | LUT_INI | | 0024259E |
| COPYCODE | | 00242990 | MBEEP | | 0024285A |
| COPYLOOP | | 0024299E | NEXTEXIT | | 002424F8 |
| COUNTER | | 0024292A | NEXTLINE | | 002424D4 |
| CRTY_C | | 00FF0904 | NEXTREP | | 002424EA |
| CS | | 00000004 | NLEND | | 0024251C |
| DEVELOFF | | 002427DE | NLMID | | 00242506 |
| DEVELON | | 00242460 | NLSAVE | | 00242526 |
| DMABASE | | 00FF0800 | NORM | | 00242928 |
| DMABFC | | 00000039 | NWRITES | | 00000002 |
| DMACCR | | 00000007 | NXTLINIT | | 0024249A |
| DMACLR | | 0024267A | OUTPUT | | 00000006 |
| DMACLR1 | | 00242688 | PAS1 | | 002423AB |
| DMACPR | | 0000002D | PASS | | 000023AB |
| DMACSR | | 00000000 | PL | | 00000726 |
| DMADAR | | 00000014 | PXHIGH | | 00000005 |
| DMADCR | | 00000004 | PXLOFF | | 00000000 |
| DMADFC | | 00000031 | PXLOW | | 00000011 |
| DMAEIN | | 00000027 | RC | | 00000001 |
| DMAGCR | | 000000FF | RDYLTOFF | | 002427C4 |
| DMAIN1 | | 002425D2 | RDYLTON | | 002427BA |
| DMAIN2 | | 002425D8 | READ1 | | 0024271C |
| DMAMAR | | 0000000C | READ2 | | 00242730 |
| DMAMFC | | 00000029 | READGO | | 0024270C |
| DMAMTC | | 0000000A | RERESTRT | | 00242086 |
| DMANIN | | 00000025 | RESTART | | 00242040 |
| DMAOCR | | 00000005 | RM | | 00000047 |
| DMASCR | | 00000006 | S1 | | 00242702 |
| DMA_INI | | 002425C0 | SECOND | | 002425FC |
| DOSBASE | | 00240000 | SPASS1 | | 00242319 |
| DRYEROFF | | 0024277A | SPASS2 | | 00242338 |
| DRYERON | | 00242772 | START | | 00242000 |
| ERRFF | | 0024290E | STPPXC | | 0000FFD0 |
| FEEDFILM | | 002428AA | STR1 | | 002422C0 |
| FFE1 | | 00242389 | STR2 | | 002422E7 |
| FFE2 | | 002423AB | STRPXC | | 0000FF70 |
| FFLP | | 002428BE | TCS | | 00000028 |
| FFSA1 | | 002422E7 | TEST | | 00242984 |
| FFSA2 | | 002422FB | TM | | 0000010E |
| FGSERV | | 00242678 | TMRCTL | | 00FF0902 |
| FILMPASS | | 0024214E | TMRDAT | | 00FF0900 |
| FILMSENS | | 002428A4 | TMR_INI | | 00242694 |
| FL | | 000001E0 | TONEROFF | | 002427D6 |
| FPASS1 | | 002422FB | TONERON | | 002427CE |
| FPASS2 | | 00242319 | TRANSFOR | | 0024279E |
| FSHTROFF | | 00242810 | TRANSOFF | | 0024278C |
| FSHTRON | | 00242808 | TRANSON | | 00242782 |
| FSPEDOFF | | 00242820 | TRANSREV | | 00242794 |
| FSPEDON | | 00242818 | V1 | | 002427F0 |
| GOB1 | | 0024235A | VACDEL | | 002427F6 |
| GOB2 | | 0024236C | VACUMOFF | | 00242800 |
| H1 | | 00242248 | VACUMON | | 002427E3 |
| H2 | | 00242281 | WGB1 | | 00242338 |
| HANSHK | | 002428D8 | WGB2 | | 0024235A |
| HOLDLOOP | | 002428D0 | WHTCNT1 | | 00242958 |
| HOM1 | | 00242281 | YTABLE | | 0024254A |
| HOM2 | | 002422C0 | ZLUT | | 0000A000 |
| HOMESEE | | 00242746 | ZSEL | | 00FF0903 |

What is claimed is:

1. Apparatus for exposing an imaging element to imaging radiation of a predetermined intensity magnitude, the apparatus having noise associated therewith, comprising:

means for producing first and second imaging beams at at least two distinct first and second spaced positions respectively, each imaging beam carrying the same image information, each imaging beam containing approximately one-half of the predetermined magnitude of imaging radiation intensity; and means for transporting an imaging element past the first and second spaced positions so that the same predetermined portion of the imaging element receives both imaging beams, whereby the effects of the noise of the apparatus are reduced.

2. The apparatus of claim 1 wherein said imaging beam producing means comprises:

a phosphor layer having a predetermined area; and means for producing, modulating and directing an excitation beam onto the phosphor layer at least two distinct regions thereof thereby to produce the first and second imaging beams.

3. The apparatus according to claim 2 further comprising an optical fiber faceplate interposed between the phosphor layer and the imaging element.

4. The apparatus in accordance with claim 1 wherein the imaging beam producing means comprises:

a reflective member;

a source of a beam of coherent radiation; and means for modulating and directing the coherent radiation beam onto at least two distinct regions of the reflective member.

5. An apparatus in accordance with claim 4 further comprising means to focus the coherent radiation beam.

6. The apparatus of claim 1 further comprising:

location sensor means responsive to the transporting means operatively coupled to the imaging beam producing means for generating the first imaging beam when the predetermined portion of the imaging element is located at the first spaced position and for generating the second imaging beam when the same predetermined portion of the imaging element is located at the second spaced position.

7. The apparatus of claim 4 further comprising:

location sensor means responsive to the transporting means operatively coupled to the imaging beam producing means for generating the first imaging beam when the predetermined portion of the imaging element is located at the first spaced position and for generating the second imaging beam when the same predetermined portion of the imaging element is located at the second spaced position.

8. The apparatus of claim 2 further comprising:

location sensor means responsive to the transporting means operatively coupled to the imaging beam producing means for generating the first imaging beam when the predetermined portion of the imaging element is located at the first spaced position and for generating the second imaging beam when the same predetermined portion of the imaging element is located at the second spaced position.

9. A method for producing an image having reduced banding defects comprising the steps of:

producing at first and second spaced positions, respectively, a first and a second imaging beam, the first and second imaging beams being representative respectively of first and second representations of the same predetermined latent image but with different noise components, each imaging beam containing one-half of the predetermined magnitude of imaging radiation intensity; and transporting an imaging element past the first and second positions to expose sequentially a same predetermined portion of the imaging element to the imaging beams.

10. The method of claim 9 wherein the step of producing first and second imaging beams comprises scanning an excitation beam across two distinct regions of a phosphor layer.

11. The method of claim 9 wherein the step of producing first and second imaging beams comprises reflecting a coherent radiation beam from at least two distinct regions of a reflective member.

12. A method for producing an image having reduced banding comprising the steps of:

(a) scanning an imaging beam having a finite width along at least a first and a second parallel scanning position line spaced from each other a preselected number of beam widths;

(b) advancing the imaging element in a direction transverse to the scanning position lines at a constant rate to bring a first portion thereof under the first scanning position line;

(c) modulating the imaging beam with image bearing information as the beam scans the first portion of the imaging element when that first portion is under the first scanning position line to produce on the imaging element a first intermediate scanned line, the beam having approximately one-half of a predetermined magnitude of imaging radiation intensity;

(d) further advancing the imaging element in the direction transverse to the scanning position lines at a constant rate to bring a second portion of the imaging element under the first scanning position line, the beam having approximately one-half of a predetermined magnitude of imaging radiation intensity;

(e) modulating the imaging beam with image bearing information to produce a second intermediate line on the second portion of the imaging element, the beam having approximately one-half of a predetermined magnitude of imaging radiation intensity;

(f) determining when the first intermediate scanned line has advanced to a location coincident with the second scanning position line;

(g) modulating the imaging beam with the same image bearing information used to produce the first intermediate scanned line and scanning the imaging beam across the imaging element along the second scanning position line to produce a first final scanned line, the beam having approximately one-half of a predetermined magnitude of imaging radiation intensity;

(h) determining when the second intermediate scanned line has advanced to a location coincident with the second scanning position line; and (i) modulating the imaging beam with the same image bearing information used to produce the second intermediate scanned line and scanning the imaging beam across the imaging element along the second scanning position line to produce a second final scanned line, the beam having approximately one-half of a predetermined magnitude of imaging radiation intensity.

13. The method of claim 12 further comprising the step of: repeating steps a through i a sufficient number of times to completely scan the full length of the imaging element.

14. An apparatus for producing a continuous tone toned electrophotographic image by exposing an imaging element to imaging radiation of a predetermined intensity magnitude, the apparatus having noise associated therewith, comprising:
   (a) a rotating drum having means for holding and transporting an imaging element thereon along a predetermined path including first and second spaced positions:
   (b) a dispenser of imaging elements placed adjacent the drum surface and means to dispense one imaging element at a time from the dispenser onto the drum, the imaging element having an imaging surface thereon;
   (c) charging means located adjacent to the drum following the dispenser in the direction of rotation of the drum for establishing a uniform electrical charge on the surface of the imaging element;
   (d) means for producing a latent electrostatic image on the imaging surface;
   (e) toning means to apply an electrostatic toner on the latent electrostatic image on the imaging surface to render the latent image visible; and
   (f) means to permanently fix the toner image on the imaging surface;
   (g) wherein the means for producing the latent electrostatic image itself comprises: means for producing first and second imaging beams at the first and second spaced positions, respectively, each imaging beam carrying the same image information, each imaging beam containing approximately one-half of the predetermined magnitude of imaging radiation intensity; and
   means associated with the drum responsive to the transporting means for generating the first imaging beam when the predetermined portion of the imaging element is located at the first spaced position and for generating the second imaging beam when the same predetermined portion of the imaging element is located at the second spaced position, whereby the effects of the noise of the apparatus are reduced.

15. Apparatus for exposing an imaging element to imaging radiation of a predetermined intensity magnitude, the apparatus having noise associated therewith, comprising:
   means for producing a predetermined number S of imaging beams at a respective one of a corresponding number S of spaced positions, each imaging beam carrying the same imaging information, each imaging beam containing approximately a fraction 1/S of the imaging radiation intensity; and,
   means for transporting an imaging element past S spaced positions so that the same predetermined portion of the imaging element receives all S imaging beams, whereby the effects of the noise of the apparatus are reduced.

16. A method for producing an image having reduced banding comprising the steps of:
   producing at each of S spaced positions a respective one of a number S of imaging beams, each imaging beam carrying the same imaging information, each imaging beam containing approximately 1/S of a predetermined magnitude of imaging radiation intensity; and
   transporting an imaging element past the S spaced positions to expose sequentially a same predetermined portion of the imaging element to the imaging beams.

* * * * *